United States Patent
Sada

[19]

[11] Patent Number: 5,548,968
[45] Date of Patent: Aug. 27, 1996

[54] REFRIGERATON APPARATUS

[75] Inventor: Shinri Sada, Osaka, Japan

[73] Assignee: Daikin Industries, Ltd., Osaka, Japan

[21] Appl. No.: 449,276

[22] Filed: May 24, 1995

Related U.S. Application Data

[62] Division of Ser. No. 307,701, Sep. 23, 1994.

[30] Foreign Application Priority Data

Feb. 26, 1993 [JP] Japan ........................ 5-37878
Feb. 28, 1994 [WO] WIPO .................. PCT/JP94/00314

[51] Int. Cl.⁶ .................................................. F24F 11/00
[52] U.S. Cl. ................................. 62/175; 62/324.6
[58] Field of Search ........................ 62/175, 509, 510, 62/196.2, 324.1, 324.6

[56] References Cited

U.S. PATENT DOCUMENTS

| | | | |
|---|---|---|---|
| 2,463,881 | 3/1949 | Kemler | 62/510 X |
| 3,905,202 | 9/1975 | Taft et al. | 62/510 X |
| 4,621,505 | 11/1986 | Ares et al. | 62/509 |
| 4,926,652 | 5/1990 | Kitamoto | 62/175 |
| 4,945,733 | 8/1990 | LaBrecque | 62/509 X |
| 5,142,879 | 9/1992 | Nakamura et al. | 62/160 |
| 5,279,131 | 1/1994 | Urushihata et al. | 62/324.1 |

FOREIGN PATENT DOCUMENTS

| | | |
|---|---|---|
| 54-146052 | of 1979 | Japan . |
| 4324069 | of 1992 | Japan . |
| 4208370 | of 1992 | Japan . |

*Primary Examiner*—William E. Tapolcai
*Attorney, Agent, or Firm*—Sixbey, Friedman, Leedom & Ferguson, P.C.; Gerald J. Ferguson, Jr.; Tim L. Brackett, Jr.

[57] ABSTRACT

Liquid lines (5LA, 5LB) and gas lines (5GA, 5GB) are connected to a main liquid line (4L) and a main gas line (4G) respectively so that a master outdoor unit (2A) and a slave outdoor unit (2B) are arranged in parallel with each other. On the gas line (5GB) extending from the slave outdoor unit (2B), a gas stop valve (V2) which is fully closed when the slave outdoor unit (2B) is deactivated during heating operation is disposed. On the liquid line (5LB) extending from the slave outdoor unit (2B), a liquid stop valve (V1) which is fully closed when the slave outdoor unit (2B) is deactivated during cooling operation and heating operation is disposed. Thus, compression of a liquid refrigerant and lack of a circulation amount of refrigerant are prevented.

16 Claims, 12 Drawing Sheets

– 1 –

REFRIGERATON APPARATUS

This is a Divisional application of Ser. No. 08/307,701, filed Sep. 23, 1994.

TECHNICAL FIELD

This invention relates to a refrigeration apparatus having a plurality of thermal source units.

BACKGROUND ART

Conventionally, there has been known an air conditioner as a refrigeration apparatus in which a plurality of indoor units are connected in parallel with one another through refrigerant piping with respect to a single outdoor unit in order to form multi-type indoor units, as disclosed in the Japanese Patent Application Laid Open Gazette No. 4-208370. The outdoor unit has a compressor, a four-way selector valve, an outdoor heat exchanger, an outdoor motor-operated expansion valve and a receiver. The indoor unit has an indoor motor-operated expansion valve and an indoor heat exchanger.

At a cooling operation, a refrigerant discharged from the compressor is circulated, so as to be condensed at the outdoor heat exchanger, reduced in pressure at the indoor motor-operated expansion valve, evaporated at the indoor heat exchanger and then returned to the compressor. During a heating operation, a refrigerant discharged from the compressor is circulated, so as to be condensed at the indoor heat exchanger, reduced in pressure at the outdoor motor-operated expansion valve, evaporated at the outdoor heat exchanger and then returned to the compressor.

Further, in the outdoor unit, the capacity of the compressor is regulated according to the load of the indoor unit.

Problems that the invention is to solve

In the above-mentioned air conditioner, since only a single outdoor unit is provided, it is required that may kinds of outdoor units having different capacities from one another are produced in correspondence with the indoor load, i.e., the number of indoor units to be connected. In addition, when the indoor load does not accord with the capacity of the outdoor unit, the capacity of the outdoor unit is disadvantageously increased in spite of a small indoor load.

To cope with the above problems, a plurality of outdoor units, for example, two outdoor units, having different capacities from one another, may be combined with one another in order to form multi-type outdoor units.

In such a case, when the outdoor unit under cooling or heating operation and the outdoor unit in deactivation exist at the same time, the refrigerant must be prevented from being stored in the outdoor unit in deactivation in order that a fixed circulation amount of refrigerant is retained. That is, it is necessary to prevent lack of a circulation amount of refrigerant.

Further, when one of the outdoor units is deactivated during heating operation, a large amount of gas refrigerant can be condensed in the outdoor unit or the refrigerant piping. Therefore, it is required to prevent the compressor from compressing a liquid refrigerant upon reactivation of the outdoor unit.

Furthermore, when the air conditioner has a plurality of outdoor units, the refrigerant piping extending from the outdoor units is connected to two main pipes and the main pipes conducted on the indoor side. However, in case that the piping arrangement is made at a free hand at the installation, an angle of tilt of piping required for backing oil cannot be secured or a part of piping to be horizontally arranged may be inclined. This disadvantageously prevents high-reliable air conditioning.

In view of the foregoing problems, this invention has been made. The present invention has its object of preventing the compression of a liquid refrigerant and the lack of a circulation amount of refrigerant owing to the storage of the refrigerant and the like and securing an accurate installation of the refrigerant piping.

DISCLOSURE OF INVENTION

To attain the foregoing object, a refrigeration apparatus of the present invention has a closing mechanism for allowing and preventing a flow of refrigerant, and/or has ejecting means for ejecting a refrigerant or recovering means for recovering a refrigerant, and/or has a construction in which a connecting part of a plurality of thermal source units is unitized.

Construction

In detail, a refrigeration apparatus of this invention comprises a plurality of thermal source units (2A, 2B) which each have a compressor (21) and a thermal-source-side heat exchanger (24) connected at an end thereof to the discharge side of the compressor (21), and in which liquid lines (5LA, 5LB) are connected to the other ends of the thermal-source-side heat exchangers (24) respectively and gas lines (5GA, 5GB) are connected to the inlet sides of the compressors (21) respectively. Further, in the refrigeration apparatus, there is provided a connecting circuit part (11) for connecting outer ends of the liquid lines (5LA, 5LB) and outer ends of the gas lines (5GA, 5GB) to a main liquid line (4L) and a main gas line (4G) respectively so that the thermal source units (2A, 2B) are arranged in parallel with one another. Furthermore, the refrigeration apparatus has a plurality of use units (3A, 3B) which each have a user-side expansion mechanism (33) and a user-side heat exchanger (32) and which are connected to the main liquid line (4L) and the main gas line (4G) so as to be arranged in parallel with one another.

In addition, on the liquid line (5LB) of at least one thermal source unit (2B) between the plural thermal source units (2A, 2B), there is disposed a liquid-line closing mechanism (V1) which is fully closed when the thermal source unit (2B) is deactivated during cooling operation.

In a refrigeration apparatus of the present invention, a receiver (12) for connecting each of the liquid lines (5LA, 5LB) to the main liquid line (4L) is disposed at a connecting part between the liquid lines (5LA, 5LB) and the main liquid line (4L).

As shown in FIG. 1, a refrigeration apparatus of the present invention comprises: a master thermal source unit (2A) which has a compressor (21), a thermal-source-side heat exchanger (24) connected at an end thereof to the discharge side and the inlet side of the compressor (21) so as to be switchable between the two sides of the compressor (21) and at the other end to a liquid line (5LA), and a thermal-source-side expansion mechanism (25) disposed on the liquid line (5LA), and in which a gas line (5GA) is connected to the discharge side and the inlet side of the compressor (21) so as to be switchable between the two sides of the compressor (21); a slave thermal source unit (2B) which has a compressor (21), a thermal-source-side heat exchanger (24) connected at an end thereof to the discharge side and the inlet side of the compressor (21) so as to be switchable between the two sides of the compressor (21) and at the other end to a liquid line (5LB), and a thermal-source-side expansion mechanism (25) disposed on the liquid line (5LB), and in which a gas line (5GB) is connected to the discharge side and inlet side of the compressor (21) so as to be switchable between the two sides of the compressor (21). Further, in the refrigeration apparatus, there is provided a connecting circuit part (11) for connecting outer ends of the liquid lines (5LA, 5LB) and outer ends of the gas lines (5GA, 5GB) to a main liquid line (4L) and a main gas line (4G) respectively so that the thermal source units (2A, 2B) are arranged in parallel with each other. Furthermore, the refrigeration apparatus has a plurality of user units (3A, 3B) which each have a user-side heat exchanger (32) and which are connected to the main liquid line (4L) and main gas line (4G) so as to be arranged in parallel with one another.

In addition, on the liquid line (5LB) extending toward the slave thermal source unit (2B), there is disposed a liquid-line closing mechanism (V1) which fully closed when the slave thermal source unit (2B) is deactivated during refrigerating operation. On the gas line (5GB) extending toward the slave thermal source unit (2B), there is provided a gas-line closing mechanism (V2) which is fully closed when the slave thermal source unit (2B) is deactivated during heating operation.

In a refrigeration apparatus of the present invention, a receiver (12) for connecting each of the liquid lines (5LA, 5LB) to the main liquid line (4L) is disposed at a connecting part between the liquid lines (5LA, 5LB) and the main liquid line (4L).

In a refrigeration apparatus of the present invention, a bypass line (29) which bypasses the compressor (21) of the slave thermal source unit (2B) is connected to the discharge and inlet sides of the compressor (21), and a bypass closing mechanism (V3) is disposed on the bypass line (29). Further, there is disposed refrigerant ejecting means (61) for ejecting a liquid refrigerant remaining in the slave thermal source unit (2B) in such a manner as to open the bypass closing mechanism (V3) and the thermal-source-side expansion mechanism (25) each included in the slave thermal source unit (2B) in deactivation, the liquid-line closing mechanism (V1) and the gas-line closing mechanism (V2) for a set time just after the slave thermal source unit (2B) is deactivated during heating operation.

In a refrigeration apparatus of the present invention, there is disposed in each of the user units (3A, 3B) a user-side expansion mechanism (33) which is located between the main liquid line (4L) and the user-side heat exchanger (32). Further, there are provided: refrigerant-amount detecting means (62) for detecting lack of a circulation amount of refrigerant; and refrigerant recovering means (63) for recovering a refrigerant from the slave thermal source unit (2B) in deactivation when the slave thermal source unit (2B) is deactivated during heating operation and the refrigerant-amount detecting means (62) detects the lack of a circulation amount of refrigerant, in such a manner as to open the thermal-source-side expansion mechanism (25) of the slave thermal source unit (2B) in deactivation and the liquid-line closing mechanism (V1) and throttle the user-side expansion mechanism (33) so as to reduce a pressure of a liquid refrigerant to a saturation pressure according to an open-air temperature.

As shown in FIG. 2, a refrigeration apparatus of the present invention comprises: a master thermal source unit (2A) having a compressor (21), a thermal-source-side heat exchanger (24) connected at an end thereof to the discharge side and the inlet side of the compressor (21) so as to be switchable between the two sides of the compressor (21) and at the other end to a liquid line (5LA) and a thermal-source-side expansion mechanism (25) which is disposed on the liquid line (5LA) and capable of regulating an opening thereof, in which a gas line (5GA) is connected to the discharge side and the inlet side of the compressor (21) so as to be switchable between the two sides of the compressor (21); a slave thermal source unit (2B) having a compressor (21), a thermal-source-side heat exchanger (24) connected at an end thereof to the discharge side and the inlet side of the compressor (21) so as to be switchable between the two sides of the compressor (21) and at the other end to a liquid line (5LB), and a thermal-source-side expansion mechanism (25) which is disposed on the liquid line (5LB) and capable of regulating an opening thereof, in which a gas line (5GB) is connected to the discharge side and the inlet side of the compressor (21) so as to be switchable between the two sides of the compressor (21); a connecting circuit part (11) for connecting outer ends of the liquid lines (5LA, 5LB) and outer ends of the gas lines (5GA, 5GB) to a main liquid line (4L) and a main gas line (4G) respectively so that the thermal source units (2A, 2B) are arranged in parallel with each other; and a plurality of user units (3A, 3B) which each have a user-side heat exchanger (32) and which are connected to the main liquid line (4L) and the main gas line (4G) so as to be arranged in parallel with one another.

Further, at a connecting part located between the liquid lines (5LA, 5LB) and the main liquid line (4L) a receiver (12) which connects each of the liquid lines (5LA, 5LB) to the main liquid line (4L) is disposed. In addition, on the gas line (5GB) extending toward the slave thermal source unit (2B), there is provided a gas-line closing mechanism (V2) which is fully closed when the slave thermal source unit (2B) is deactivated during heating operation. Furthermore, there is provided full-closure control means (6) for controlling the thermal-source-side expansion mechanism (25) of the slave thermal source unit (2B) in deactivation to be fully closed when the slave thermal source unit (2B) is deactivated during refrigerating operation.

In a refrigeration apparatus of the present invention, a bypass line (29) which bypasses the compressor (21) of the slave thermal source unit (2B) is connected to the discharge and inlet sides of the compressor (21), and a bypass closing mechanism (V3) is provided on the bypass line (29). Further, there is disposed refrigerant ejecting means (61) for ejecting a liquid refrigerant remaining in the slave thermal source unit (2B) in such a manner as to open the bypass closing mechanism (V3) and the thermal-source-side expansion mechanism (25) each included in the slave thermal source unit (2B) in deactivation, and the gas closing mechanism (V2) for a set time just after the slave thermal source unit (2B) is deactivated during heating operation.

In a refrigeration apparatus of the present invention, there is provided in each of the user units (3A, 3B) a user-side expansion mechanism (33) located between the main liquid line (4L) and the user-side heat exchanger (32). Further, the refrigeration apparatus has refrigerant-amount detecting means (62) for detecting lack of a circulation amount of refrigerant, and refrigerant recovering means (63) for recovering a refrigerant from the slave thermal source unit (2B) in deactivation when the slave thermal source unit (2B) is deactivated during heating operation and the refrigerant-amount detecting means (62) detects the lack of a circulation amount of refrigerant, in such a manner as to open the thermal-source-side expansion mechanism (25) of the slave thermal source unit (2B) in deactivation and throttle the user-side expansion mechanism (33) so as to reduce a pressure of the liquid refrigerant to a saturation pressure according to an open-air temperature.

As shown in FIG. 7, a refrigerant recovering line (8) through which a refrigerant flows from the slave thermal source unit (2B) to the master thermal source unit (2A) is disposed between a gas-refrigerant pipe (26) extending from the thermal-source-side heat exchanger (24) of the master thermal source unit (2A) and the gas line (5GB) extending from the slave thermal source unit (2B).

As shown in FIG. 9, a refrigeration apparatus of the present invention has a connecting circuit part (11) for connecting each of outer ends of liquid lines (5LA, 5LB) of master and slave thermal source units (2A, 2B) to a main liquid line (4L) and connecting an outer end of the gas line (5GA) of the master thermal source unit (2A) to a main gas line (4G), instead of the connecting circuit part (11) and the gas closing mechanism (V2) of claim 3. Further, in the refrigeration apparatus, there is disposed a branch line (5a) which is connected at an end thereof to a gas-refrigerant pipe (26) extending from the thermal-source-side heat exchanger (24) of the master thermal source unit (2A). In addition, in the connecting circuit part (11), there is disposed a constant-pressure circuit (9): which has a normally high-pressure passage (91) held normally in a state of high pressure and a normally low-pressure passage (92) held normally in a state of low pressure; and in which the normally high-pressure passage (91) and the normally low-pressure passage (92) are each connected to the main gas line (4G) and the branch line (5a). In the constant-pressure circuit (9), the gas line (5GB) of the slave thermal source unit (2B) is connected to the normally high-pressure passage (91), in order that a refrigerant flows from the gas line (5GB) toward normally high-pressure passage (91), and the gas line (5GB) of the slave thermal source unit (2B) is connected to the normally low-pressure passage (92) in order that a refrigerant flows from the normally low-pressure passage (92) toward the gas line (5GB).

In a refrigeration apparatus of the present invention, a receiver (12) for connecting each of the liquid lines (5LA, 5LB) to the main liquid line (4L) is disposed at a connecting part between the liquid lines (5LA, 5LB) and the main liquid line (4L).

As shown in FIG. 10, in a refrigeration apparatus of the present invention, there are provided a connecting circuit part (11), a branch line (5a) and a constant-pressure circuit (9) as are in claim 11, instead of the connecting circuit part (11) and the gas-line closing mechanism (V2).

In a refrigeration apparatus of the present invention, a refrigerant recovering passage (8a) through which a refrigerant flows from the gas line (5GB) of the slave thermal source unit (2B) toward the normally low-pressure passage (92) of the constant-pressure circuit (9) is connected between the normally low-pressure passage (92) and the gas line (5GB).

As shown in FIG. 11, in a refrigeration apparatus of the present invention, there is provided a connecting gas line (10) which is connected at respective ends thereof to the respective gas-refrigerant pipes (26) of the thermal-source-side heat exchangers (24) of the thermal source units (2A, 2B) and which has a closing mechanism (V19) for preventing a refrigerant from flowing, when at least one thermal source unit (2B) is deactivated during cooling operation, into the thermal source unit (2B) in deactivation.

In a refrigeration apparatus of the present invention, the connecting circuit part (11) is formed in a single unit.

OPERATION

Under the above constructions, in the refrigeration apparatus high-pressure gas refrigerants discharged from the compressors (21) of the thermal source units (2A, 2B) are first condensed at the thermal-source-side heat exchangers (24) to turn liquid refrigerants. The two flows of the liquid refrigerants meet at the main liquid line (4L) of the connecting circuit part (11). In particular, in case of the refrigeration apparatus of claim 2, the liquid refrigerants meet at the receiver (12). Then, in each of the user units (3A, 3B), the liquid refrigerant is reduced in pressure at the user-side expansion mechanism (33) and evaporated at the user-side heat exchanger (32) to turn a gas refrigerant having low pressure. The gas refrigerant is distributed at the connecting circuit part (11) to the gas lines (5GA, 5GB) and then returned to the compressors (21) of the thermal source units (2A, 2B). A cooling operation is made by repeating the above circulating process.

Further, when at least one thermal source unit (2B) is deactivated during cooling operation, the liquid-line closing mechanism (V1) is closed to prevent the liquid refrigerant from being stored in the thermal source unit (2B).

In the refrigeration apparatus of the present invention, at its cooling operation, high-pressure gas refrigerants discharged from the compressors (21) of the thermal source units (2A,2B) are first condensed at the thermal-source-side that heat exchangers (24) to turn liquid refrigerants. The two flows of the liquid refrigerants meet at the main liquid line (4L) of the connecting circuit part (11). In particular, in cases of the refrigeration apparatus of claims 4 and 7, the liquid refrigerants meet at the receiver (12). Then, in each of the user units (3A,3B), the liquid refrigerant is reduced in pressure at the user-side expansion mechanism (33) or the like and evaporated at the user-side heat exchanger (32) to turn a gas refrigerant having low pressure. The gas refrigerant is distributed at the connecting circuit part (11) to the gas lines (5GA,5GB) and then returned to the compressors (21) of the thermal source units (2A,2B). The cooling operation is made by repeating the above circulating process.

At a heating operation, high-pressure gas refrigerants discharged from the compressors (21) of the thermal source units (2A,2B) flow into the connecting circuit part (11) and meet at the main gas line (4G). Then, the collected gas refrigerant flows into the user units (3A,3B). The gas refrigerant is condensed at each of the user-side heat exchangers (32) to turn a liquid refrigerant. The liquid refrigerant flows through the main liquid line (4L) and then is distributed at the connecting circuit part (11) to the liquid lines (5LA,5LB) running to the thermal source units (2A,2B). In particular, the refrigerant is distributed at the receiver (12). Then, in the thermal source units (2A,2B), the distributed liquid refrigerants are each reduced in pressure at the thermal-source-side expansion mechanism (25) and evaporated at the thermal-source-side heat exchanger (24) to turn a gas refrigerant having low pressure. Then, the gas refrigerants are returned to the compressors (21) of the thermal source units (2A,2B). The heating operation is made by repeating the above circulating process. When the slave thermal source unit (2B) is deactivated during heating operation, the gas-line closing mechanism (V2) is closed, so that the liquid refrigerant is prevented from being stored in the slave thermal source unit (2B) in deactivation and a circulation amount of refrigerant is prevented from being lacked between the master thermal source unit (2A) and the user units (3A,3B).

Further, when the slave thermal source unit (2B) is deactivated during cooling operation and heating operation, the liquid-line closing mechanism (V1) or the thermal-source-side expansion mechanism (25) is closed, so that the liquid refrigerant is prevented from being stored in the slave thermal source unit (2B) in deactivation and a circulation amount of refrigerant is prevented from being lacked between the master thermal source unit (2A) and the user units (3A,3B).

In the refrigeration apparatus of the present invention, just after the slave thermal source unit (2B) is deactivated during heating operation, the refrigerant ejecting means (61) opens the bypass closing mechanism (V3), the thermal-source-side expansion mechanism (25) of the slave thermal source unit (2B), the liquid-line closing mechanism (V1) and the gas-line closing mechanism (V2) for a set time. Just after the slave thermal source unit (2B) is deactivated during heating operation, the refrigerant ejecting means (61) opens the bypass closing mechanism (V3), the thermal-source-side expansion mechanism (25) of the slave thermal source unit (2B) and the gas-line closing mechanism (V2) for a set time. Consequently, the high-pressure gas refrigerant in the master thermal source unit (2A) flows into the liquid line (5LB) via the gas line (5GB) of the slave thermal source unit (2B), so that the liquid refrigerant remaining in the slave thermal source unit in deactivation is ejected into the main liquid line (4L) or the like, thus preventing lack of a circulating amount of refrigerant.

In detail, when the refrigerant flows through the main gas line (4G) or the like, the pressure of the refrigerant is reduced due to a pressure loss. In the user units (3A,3B) under heating operation, the difference between the pressure losses of the user units (3A,3B) resulting from the difference between the piping lengths thereof is compensated. For example, the difference between the pressure losses is compensated by a motor-operated expansion valve as the user-side expansion mechanism (33). As a result of this, the pressure of the refrigerant in the main liquid line (4L) becomes lower than the pressure of the refrigerant which is discharged from the compressor (21), so that the liquid refrigerant remaining in the slave thermal source unit (2B) is ejected into the main liquid line (4L) or the like.

In the refrigeration apparatus, when the slave thermal source unit (2B) is deactivated during heating operation and the refrigerant-amount detecting means (62) detects lack of a circulating amount of refrigerant, the refrigerant recovering means (63) opens the thermal-source-side expansion mechanism (25) and the liquid-line closing mechanism (V1) and throttles the user-side expansion mechanism (33), thereby reducing the pressure of the liquid refrigerant to a saturation pressure according to an open-air temperature. In the refrigerating apparatus, when the slave thermal source unit (2B) is deactivated during heating operation and the refrigerant-amount detecting means (62) detects lack of a circulating amount of refrigerant, the refrigerant recovering means (63) opens the thermal-source-side expansion mechanism (25) and throttles the user-side expansion mechanism (33), thereby reducing the pressure of the liquid refrigerant to a saturation pressure according to an open-air temperature. Consequently, the liquid refrigerant remaining in the slave thermal source unit (2B) in deactivation is evaporated so that the evaporated refrigerant is returned to the master thermal source unit (2A).

When the slave thermal source unit (2B) is deactivated during heating operation, the refrigerant recovering line (8) establishes communications between the gas line (5GB) connecting to the slave thermal source unit (2B) and a low-pressure gas side of the master thermal source unit (2A), so that the refrigerant remaining in the slave thermal source unit (2B) in deactivation is returned to the master thermal source unit (2A).

A gas refrigerant flowing into the slave thermal source unit (2B) and a gas refrigerant discharged from the slave thermal source unit (2B) flow through the normally high-pressure passage (91) and the normally low-pressure passage (92) each forming the constant-pressure circuit (9) when flowing between the gas line (5GB) and the main gas line (4G). Accordingly, the liquid refrigerant is prevented from being stored in the slave thermal source unit (2B) without the gas-line closing mechanism (V2).

Further, the receiver (12) collects and distributes the liquid refrigerant.

When the slave thermal source unit (2B) is deactivated during heating operation, the refrigerant recovering passage (8a) normally establishes communications between the gas line (5GB) connecting to the slave thermal source unit (2B) and a low-pressure gas side of the master thermal source unit (2A) through the constant-pressure circuit (9), so that the refrigerant remaining in the slave thermal source unit (2B) in deactivation is returned to the master thermal source unit (2A).

The gas-refrigerant pipes (26) of the thermal-source side heat exchangers (24) of the thermal source units (2A,2B) are communicated with each other through the connecting gas line (10). Accordingly, circulation amounts of refrigerants which flow through the respective thermal-source-side heat exchangers (24) are approximately equal to each other, thereby increasing a coefficient of performance (COP) of the refrigeration apparatus.

EFFECTS

According to the refrigeration apparatus of the present invention, since the liquid line (5LB) of at last one thermal source unit (2B) is provided with the liquid-line closing mechanism (V1) which is fully closed when the thermal source unit (2B) is deactivated during cooling operation, a liquid refrigerant is prevented from being stored in the thermal source unit (2B) in deactivation. This prevents lack of a circulation amount of refrigerant between another thermal source unit (2A) and user units (3A,3B).

As a result of this, a plurality of thermal source units (2A,2B) can be combined. Further, since a plurality of thermal source units (2A,2B) having different capacities from one another can be produced and combined, this enables a few kinds of thermal source units (2A,2B) to cope with many kinds of loads.

Since provision of a single receiver (12) can dispense with respective receivers of the thermal source units (2A,2B), this reduces the number of elements. Further, since distribution of a liquid refrigerant is securely carried out, an unbalanced flow of refrigerant can be securely prevented even when a flash of gas flows into the main liquid line (4L) or the like.

The gas-line closing mechanism (V2) and the liquid-line closing mechanism (V1) are disposed on the gas line (5GB) and the liquid line (5LB) which connect to the slave thermal source unit (2B) respectively, the liquid-line closing mechanism (V1) is closed when the slave thermal source unit (2B) is deactivated during cooling operation and heating operation, and the gas-line closing mechanism (V2) is closed when the slave thermal source unit (2B) is deactivated during heating operation. Accordingly, a liquid refrigerant can be prevented from being stored in the slave thermal source unit (2B) in deactivation, for example, the liquid refrigerant can be prevented from being stored in a receiver or the like. In detail, because the pressure of the liquid refrigerant at the operation time is higher than a saturation pressure according to an open-air temperature, the liquid refrigerant may be stored in the receiver and the like. In this refrigeration apparatus, the storage of the liquid refrigerant can be prevented.

Further, according to this refrigeration apparatus, lack of a circulation amount of refrigerant between the master thermal source unit (2A) and the user units (3A,3B) can be prevented, and it is prevented that the liquid refrigerant remaining in the slave thermal source unit (2B) is compressed by the compressor (21) at a reactivation of the slave thermal source unit (2B).

As a result of this, a plurality of thermal source units (2A,2B) can be combined. In addition, since a plurality of thermal source units (2A,2B) having different capacities from one another can be produced and combined, this enables a few kinds of thermal source units (2A,2B) to cope with many kinds of loads.

Since provision of a single receiver (12) can dispense with respective receivers of the thermal source units (2A,2B), this reduces the number of elements. Further, since distribution of a liquid refrigerant is securely carried out, an unbalanced flow of refrigerant can be securely prevented even when a flash of gas flows into the main liquid line (4L) or the like.

Just after the slave thermal source unit (2B) is deactivated during heating operation, the refrigerant ejecting means (61) operates so that a high-pressure gas refrigerant flows from the master thermal source unit (2A) into the liquid line (5LB) via the gas line (5GB) and the slave thermal source unit (2B). Accordingly, the liquid refrigerant remaining in the slave thermal source unit (2B) in deactivation is ejected into the main liquid line (41) or the like, thereby securely preventing lack of a circulation amount of refrigerant.

When the refrigerant-amount detecting means (62) detects lack of a circulation amount of refrigerant, the refrigerant recovering means (63) throttles the user-side expansion mechanism (33) to reduce a pressure of a liquid refrigerant to a saturation pressure according to an open-air temperature. As a result of this, the liquid refrigerant remaining in the slave thermal source unit (2B) in deactivation is evaporated and returned to the master thermal source unit (2A). Accordingly, the lack of a circulation amount of refrigerant can be securely prevented at any time.

Since the thermal-source-side expansion mechanism (25) is fully closed when the slave thermal source unit (2B) is deactivated during cooling operation and heating operation, storage of a liquid refrigerant into the slave thermal source unit (2B) can be prevented as in the case of claim 3. Further, since a liquid-line closing mechanism (V1) can be dispensed with, the number of elements can be reduced.

When the slave thermal source unit (2B) is deactivated during heating operation, the refrigerant recovering line (8) establishes communications between the gas line (5GB) connecting to the slave thermal source unit (2B) and a low-pressure gas side of the master thermal source unit (2A). Accordingly, a refrigerant remaining in the slave thermal source unit (2B) in deactivation can be returned to the master thermal source unit (2A). In addition, since the refrigerant ejecting means (61) and the refrigerant recovering means (63) can be dispensed with, the construction of the refrigeration apparatus can be simplified.

Since there is provided the constant-pressure circuit (9) through which gas refrigerants flowing into and from the slave thermal source unit (2B) pass, the high-pressure gas refrigerant does not flow into the slave thermal source unit (2B) when the slave thermal source unit (2B) is deactivated during refrigerating operation. Accordingly, storage of a liquid refrigerant into the slave thermal source unit (2B) can be prevented. In addition, since the gas-line closing mechanism (V2) can be dispensed with, the construction of the refrigeration apparatus can be simplified.

When the slave thermal source unit (2B) is deactivated during heating operation, the constant-pressure circuit (9) and the refrigerant recovering passage (8a) establishes communications between the gas line (5GB) connecting to the slave thermal source unit (2B) and a low-pressure gas side of the master thermal source unit (2A). Accordingly, a refrigerant remaining in the slave thermal source unit (2B) in deactivation can be returned to the master thermal source unit (2A). In addition, since the refrigerant ejecting means (61) and the refrigerant recovering means (63) can be dispensed with, the construction of the refrigeration apparatus can be simplified.

Since the gas-refrigerant pipes (26) of the thermal-source-side heat exchangers (24) of the thermal source units (2A, 2B) are communicated with each other, circulation amounts of refrigerants which flow through the respective thermal-source-side heat exchangers (24) can be approximately equal to each other, thereby increasing a coefficient of performance (COP) of the refrigeration apparatus. In addition, between the thermal source units (2A,2B), a high-pressure sensor for detecting a high pressure at a cooling operation and a low-pressure sensor for detecting a low pressure at a heating operation can be shared. This reduces the number of elements.

Further, when the slave thermal source unit (2B) is deactivated during heating operation, a refrigerant remaining in the slaver thermal source unit (2B) in deactivation can be securely returned to the master thermal source unit (2A).

Since the connecting circuit part (11) between the thermal source units (2A,2B) and the user units (3A,3B) is unitized, an angle of tilt of piping required for backing oil can be secured and a part of piping to be horizontally arranged can be held in a horizontal position. This enables high-reliable air conditioning. In addition, since the number of pipes can be reduced when a plurality of thermal source units (2A,2B) are installed, this reduces the number of steps at a pip arrangement, thereby simplifying the pipe arrangement.

BEST MODE FOR CARRYING OUT THE INVENTION

Detailed description is made below about examples of the present invention, with reference to the drawings.

EXAMPLE 1

Figure 1:
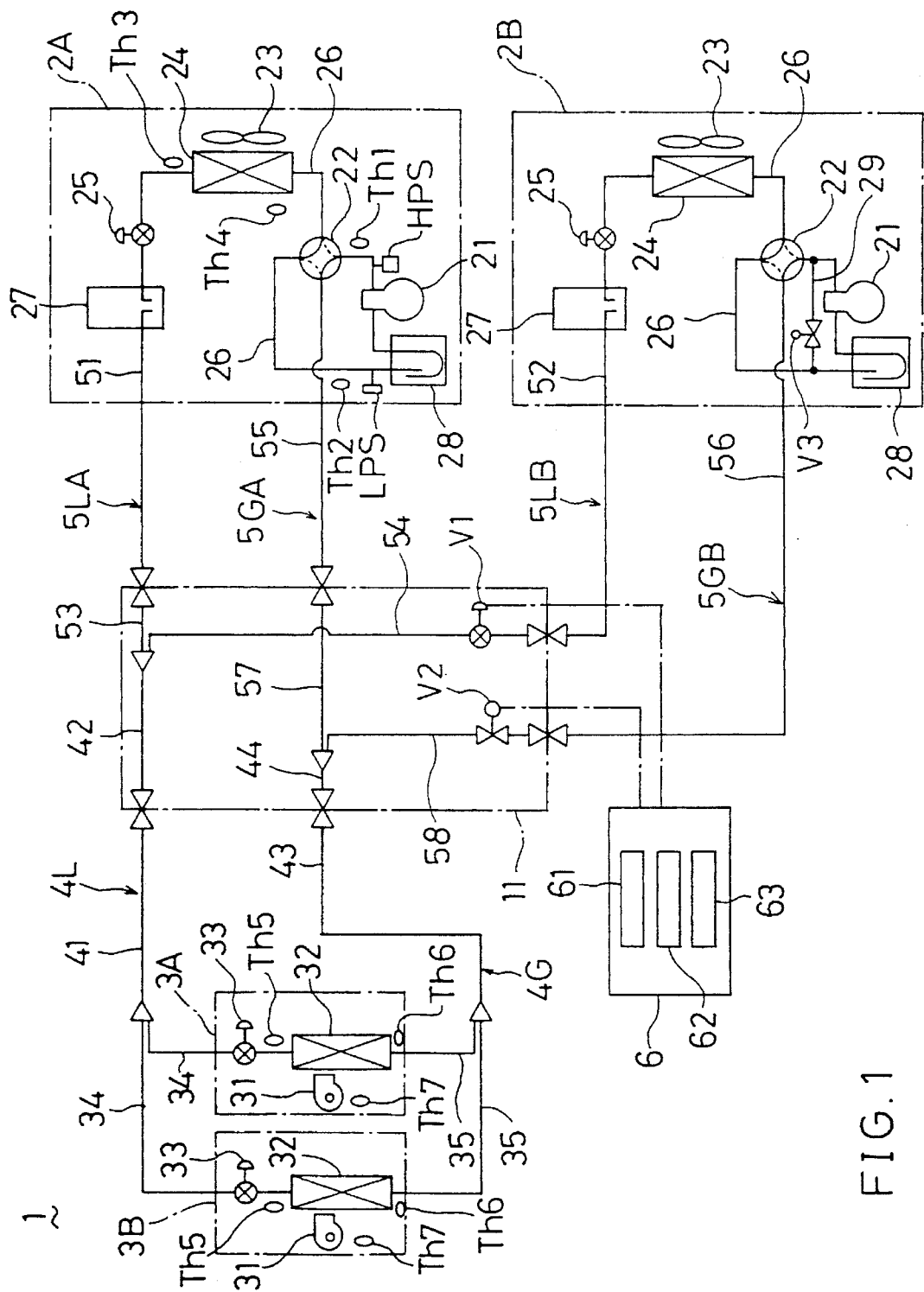
FIG. 1 is a refrigerant circuit diagram of an air conditioner showing Example 1 of a refrigeration apparatus of the present invention.

FIG. 1 shows an example of a refrigeration apparatus of the present invention. Reference numeral (1) indicates an air conditioner as a refrigeration apparatus. In the air conditioner (1), two outdoor units (2A,2B) are connected to a main liquid line (4L) and a main gas line (4G) so as to be arranged in parallel with each other, and two indoor units (3A,3B) are connected to the main liquid line (4L) and the main gas line (4G) so as to be arranged in parallel with each other.

Each of the outdoor units (2A,2B) serves as a thermal source unit having a compressor (21), a four-way selector valve (22), an outdoor heat exchanger (24) as a thermal-source-side heat exchanger which is in the proximity of an outdoor fan (23), and an outdoor motor-operated expansion valve (25) as a thermal-source-side expansion mechanism. An end of the outdoor heat exchanger (24) in which gas flows is connected to a gas-refrigerant pipe (26) and another end thereof in which liquid flows is connected to a liquid line (5LA,5LB).

The gas-refrigerant pipe (26) is connected to a discharge side of an inlet side of the compressor (21) via the four-way valve (22) which switchably selects the discharge and inlet sides of the compressor (21). The liquid line (5LA,5LB) extending from the outdoor heat exchanger (24) is connected to the main liquid line (4L) via the outdoor motor-operated expansion valve (25) and a receiver (27) for storing a liquid refrigerant in order.

Further, the compressor (21) is connected to a gas line (5GA,5GB) via the refrigerant pipe (26). The gas line (5GA,5GB) is connected to the discharge side and the inlet side of the compressor (21) via the four-way valve (22) which switchably selects the discharge and inlet sides of the compressor (21), and also connected to the main gas line (4G). An accumulator (28) is provided between the inlet side of the pressor (21) and the four-way valve (22) in the middle of the gas-refrigerant pipe (26).

Each of the indoor units (3A,3B) serves as a user unit having an indoor heat exchanger (32) as a user-side heat exchanger which is in the proximity of an indoor fan (31), and an indoor motor-operated expansion valve (33) as a user-side expansion mechanism. The indoor heat exchanger (32) is connected to the main liquid line (4L) via an indoor liquid pipe (34) and connected to the main gas line (4G) via an indoor gas pipe (35). The indoor motor-operated expansion valve (33) is disposed in the indoor liquid pipe (34).

The two outdoor units (2A,2B) is one of the features of the present invention, and so composed that a single master outdoor unit (2A) and a single slave outdoor unit (2B) are connected in parallel with each other. The capacity of each outdoor unit (2A,2B) is set according to an indoor load, i.e., the number of indoor units (3A,3B). The compressor (21) of the master outdoor unit (2A) is composed so that the capacity thereof is set in multi-steps by an inverter circuit, while the compressor (21) of the slave outdoor unit (2B) is composed so that the capacity thereof is set switchably among 100%, 50%, and 0% by unloading control.

Furthermore, various kinds of sensors are disposed in the master outdoor unit (2A) and the indoor units (3A,3B).

In the master outdoor unit (2A), a discharge-gas temperature sensor (Th1) for detecting a temperature of a gas refrigerant discharged from the compressor (21) is disposed at a part of the gas-refrigerant pipe (26) which is located on the discharge side of the compressor (21), an inlet-gas temperature sensor (Th2) for detecting a temperature of a gas refrigerant to be sucked into the compressor (21) is disposed at a part of the refrigerant pipe (26) which is located on the inlet side of the compressor (21), an outdoor-liquid temperature sensor (Th3) for detecting a temperature of a liquid refrigerant on the outdoor heat exchanger's (24) side is disposed on the liquid line (5LA), and an open-air temperature sensor (Th4) for detecting a temperature of open air is disposed in the vicinity of the outdoor heat exchanger (24). Further, a high-pressure sensor (HPS) for detecting a pressure of a gas refrigerant discharged from the compressor (21) is disposed at a portion of the gas-refrigerant pipe (26) which is located on the discharge side of the compressor (21), and a low-pressure sensor (LPS) for detecting a pressure of a gas refrigerant to be sucked into the compressor (21) is disposed at a portion of the gas-refrigerant pipe (26) which is located on the inlet side of the compressor (21).

In each of the indoor units (3A,3B), an indoor-liquid temperature sensor (Th5) for detecting a temperature of a liquid refrigerant on the indoor heat exchanger's (32) side is disposed in the indoor liquid pipe (34), an indoor-gas temperature sensor (Th6) for detecting a temperature of a gas refrigerant on the indoor heat exchanger's (32) side is disposed in the indoor gas pipe (35), and a room temperature sensor (Th7) for detecting a room temperature is disposed in the vicinity of the indoor fan (31).

Detection signals from the above sensors (Th1–Th7, HPS, LPS) are inputted into a controller (6), and based on the detection signals, the controller (6) controls openings of the motor-operated expansion valve (25,33) and the capacity of the compressor (21) and the like.

The air conditioner (1) has a piping unit (11) as a connecting circuit part. The piping unit (11) is one of features of the present invention, and connects the liquid lines (5LA,5LB) and the gas lines (5GA,5GB) on the indoor unit's (2A,2B) side to the main liquid line (4L) and the main gas line (4G), respectively.

In detail, each of the liquid lines (5LA,5LB) is composed of a liquid pipe (51,52) extending outward from the outdoor unit (2A,2B) and a liquid passage (53,54) connecting to an outer end of the liquid pipe (51,52). The liquid pipe (51,52) is connected in an inner end thereof to the outdoor heat exchanger (24). The outdoor motor-operated expansion valve (25) and the receiver (27) are disposed in the liquid pipe (51,52).

Each of the gas lines (5GA,5GB) is composed of a gas pipe (55,56) extending outward from the outdoor unit (2A, 2B) and a gas passage (57,58) connecting to an outer end of the gas pipe (55,56). The gas pipe (55,56) is connected to the compressor (21) via the four-way selector valve (22).

The main liquid line (4L) is composed of a main liquid pipe (41) extending on the indoor unit's (3A,3B) side, and a main liquid passage (42) connecting to an end of the main liquid pipe (41) and the liquid passages (53,54) on the outdoor unit's (2A,2B) side. The main liquid pipe (41) is connected at the other end thereof to the indoor liquid pipes (34) of the indoor units (3A,3B).

Each of the main gas lines (4G) is composed of a main gas pipe (43) extending on the indoor unit's (3A,3B) side, and a main gas passage (44) connecting to an end of the main gas pipe (43) and the gas passages (57,58) on the outdoor unit's (2A,2B) side. The main gas pipe (43) is connected at the other end thereof to the indoor gas pipes (35) of the indoor units (3A,3B).

The piping unit (11) is so composed that the liquid passages (53,54) of the liquid lines (5LA,5LB) on the outdoor unit's (2A,2B) side, the main liquid passage (42) of the main liquid line (4L), the gas passages (57,58) of the gas lines (5GA,5GB) on the outdoor unit's (2A,2B) side, and the main gas passage (44) of the main gas line (4G) are integrally formed and unitized.

Further, as a feature of the present invention, the piping unit (11) has a liquid stop valve (V1) and a gas stop valve (V2) which are integrally unitized. The gas stop valve (V2) is disposed in the gas passage (58) of the gas line (5GB) on the slave outdoor unit's (2B) side, and serves as a gas-line closing mechanism for opening and closing the gas passage (58). The gas stop valve (V2) is disposed in the proximity of a connecting part between the gas passage (58) on the slave outdoor unit's (2B) side and the main gas passage (44) of the main gas line (4G), and composed so as to be fully closed based on a control signal from the controller (6) when the slave outdoor unit (2B) is deactivated during heating operation.

The liquid stop valve (V1) is disposed in the liquid passage (54) of the liquid line (5LB) on the slave outdoor unit's (2B) side, and serves as a liquid-line closing mechanism for opening and closing the liquid passage (54). The liquid stop valve (V1) is disposed in the proximity of a connecting part between the liquid passage (54) on the slave outdoor unit's (2B) side and the main liquid passage (42) of the main liquid line (4L), and composed so as to be fully closed based on a control signal from the controller (6) when the slave outdoor unit (2B) is deactivated during cooling operation and heating operation.

As a feature of the present invention, the slave outdoor unit (2B) has a bypass line (29) which is connected to the discharge and inlet sides of the compressor (21) so as to bypass the compressor (21). On the bypass line (29), there is provided a bidirectional bypass stop valve (V3) for opening and closing the bypass line (29). The bypass stop valve (V3) serves as a bypass closing mechanism. In the controller (6), there is provided a refrigerant ejecting means (61), which opens, for a set time, e.g., for a few minutes, the bypass stop valve (V3), the outdoor motor-operated expansion valve (25), the liquid stop valve (V1) and the gas stop valve (V2) just after the slave outdoor unit (2B) is deactivated during heating operation, thereby ejecting a liquid refrigerant in the slave outdoor unit (2B) toward the master outdoor unit (2A).

Further, as a feature of the present invention, the controller (6) has a refrigerant-amount detecting means (62) and a refrigerant recovering means (63). The refrigerant-amount detecting means (62) is composed so as to detect lack of a circulation amount of refrigerant, when the air conditioner (1) is in a heating operation and the slave outdoor unit (2B) is deactivated, in case that the outdoor motor-operated expansion valve (25) of the master outdoor unit (2A) is fully opened and that a superheating degree of a refrigerant of the outdoor heat exchanger (24) according to the detection signals of the outdoor-liquid temperature sensor (Th3) and the inlet-gas temperature sensor (Th2) excesses a set temperature.

The refrigerant recovering means (63) is composed, in case that the refrigerant-amount detecting means (62) detects lack of a circulation amount of refrigerant when the slave outdoor unit (2B) is deactivated during heating operation, so as to open the liquid stop valve (V1) for a set time and throttle the indoor motor-operated expansion valve (33) for a set time, thereby reducing a pressure of a liquid refrigerant to a saturation pressure according to an open-air temperature. Thus, the liquid refrigerant in the slave outdoor unit (2B) in deactivation is evaporated and returned to the master outdoor unit (2A). In this case, the refrigerant recovering means (63) is composed, if the outdoor motor-operated expansion valve (25) of the slave outdoor unit (2B) in deactivation is not opened, so as to open the outdoor motor-operated expansion valve (25) for a set time.

Operation of Example 1

Description is made next about operations for controlling the air conditioner (1).

At a cooling operation, the four-way selector valve (22) is switched as shown in dash lines in FIG. 1. The respective high-pressure gas refrigerants discharged from the compressors (21) of both the outdoor units (2A,2B) are first condensed at the outdoor heat exchangers (24) to turn liquid refrigerants. The two flows of the liquid refrigerants meet at the main liquid passage (42) of the piping unit (11). Then, the collected liquid refrigerant flows into the indoor units (3A,3B). In each of the indoor units (3A,3B), the liquid refrigerant is reduced in pressure at the indoor motor-operated expansion valve (33) and evaporated at the indoor heat exchanger (32) to turn a low-pressure gas refrigerant. The gas refrigerant is distributed at the piping unit (11) to the gas passages (57,58) and then returned to the compressors (21) of the outdoor units (2A,2B). The cooling operation is made by repeating the above circulating process.

At a heating operation, the four-way selector valve (22) is switched as shown in solid lines in FIG. 1. The respective high-pressure gas refrigerants discharged from the compressors (21) of both the outdoor units (2A,2B) flow into the piping unit (11) and meet at the main gas passage (44) of the piping unit (11). Then, the collected gas refrigerant flows into the indoor units (3A,3B). The gas refrigerant is condensed at each of the indoor heat exchangers (32) to turn a liquid refrigerant. The liquid refrigerant flows through the main liquid passage (42) of the piping unit (11) and then is distributed at the piping unit (11) to the liquid passage (53,54) running to the outdoor units (2A,2B). In the outdoor units (2A,2B), the distributed liquid refrigerants are each reduced in pressure at the outdoor motor-operated expansion valve (25) and evaporated at the outdoor heat exchanger (24) to turn a low-pressure gas refrigerant. Then, the gas refrigerants are returned to the compressors (21) of the outdoor units (2A,2B). The heating operation is made by repeating the above circulating process.

In the above cooling and heating operations, the controller (6) controls openings of respective indoor motor-operated expansion valves (33) and openings of respective outdoor motor-operated expansion valves (25) and controls the capacities of the compressors (21) of respective outdoor units (2A,2B) in accordance with an indoor load. In detail, the controller (6) controls the capacity of the compressor (21) of the slave outdoor unit (2B) so as to be switched among 100%, 50%, and 0%, and controls the capacity of the compressor (21) of the master outdoor unit (2A) so as to be changed approximately in a linear proportion to an indoor load by the inverter circuit. When the load of the indoor units (3A,3B) is decreased so as to be responded by the capacity of the master outdoor unit (2A), the controller (6) deactivates the slave outdoor unit (2B).

Further, when the slave outdoor unit (2B) is deactivated during cooling operation and heating operation, the controller (6) closes the liquid stop valve (V1) thereby preventing storage of the liquid refrigerant into the receiver (27) and the like. In detail, because the pressure of the liquid refrigerant at the operation time is higher than a saturation pressures according to an open-air temperature, the liquid refrigerant may be stored in the receiver (27). The controller (6) prevents the storage of the liquid refrigerant.

In addition, when the slave outdoor unit (2B) is deactivated during heating operation, the controller (6) closes the gas stop valve (V2), thereby preventing storage of the liquid refrigerant into the slave outdoor unit (2B) in deactivation and preventing lack of a circulation amount of refrigerant between the master outdoor unit (2A) and the indoor units (3A,3B).

Just after the slave outdoor unit (2B) is deactivated during heating operation, the refrigerant ejecting means (61) opens the bypass stop valve (V3), the outdoor motor-operated expansion valve (25) of the slave outdoor unit (2B), the liquid stop valve (V1) and the gas top valve (V2) for a set time, e.g., for a few minutes. As a result of this, the high-pressure gas refrigerant flows from the master outdoor unit (2A) into the liquid line (5LB) via the gas line (5GB) of the slave outdoor unit (2B), so that the liquid refrigerant in the slave outdoor unit (2B) in deactivation is ejected into the main liquid line (41) or the like. Accordingly, lack of the a circulation amount of refrigerant is prevented.

In detail, when the refrigerant flows through the main gas line (4G) or the like, the pressure of the refrigerant is reduced due to a pressure loss. In the indoor units (3A,3B) at a heating operation, the difference between the pressure losses of the indoor units (3A,3B) resulting from the difference between the piping lengths thereof is compensated by the indoor motor-operated expansion valve (33). As a result of this, the pressure of the refrigerant in the main liquid line (4L) becomes lower than the pressure of the refrigerant discharged from the compressor (21), so that the liquid refrigerant in the slave outdoor unit (2B) is ejected into the main liquid line (4L) or the like.

When the air conditioner (1) is in heating operation and while the slave outdoor unit (2B) is deactivated, the refrigerant-amount detecting means (62) detects whether a circulation amount of refrigerant is lacking or not. In case that the outdoor motor-operated expansion valve (25) of the master outdoor unit (2A) is fully opened and that the superheating degree of the refrigerant of the outdoor heat exchanger (24) according to the detection signals of the outdoor-liquid temperature sensor (Th3) and the inlet-gas temperature sensor (Th2) excesses a set temperature, the refrigerant-amount detecting means (62) detects lack of a circulation amount of refrigerant.

When the refrigerant-amount detecting means (62) detects the lack of a circulating amount of refrigerant, the refrigerant recovering means (63) opens the liquid stop valve (V1) for a set time and throttles the indoor motor-operated expansion valve (33) for a set time to reduce the pressure of liquid the refrigerant to a saturation pressure according to an open-air temperature, so that the liquid refrigerant in the slave outdoor unit (2B) in deactivation is evaporated and thus the evaporated refrigerant is returned to the master outdoor unit (2A). In this case, if the outdoor motor-operated expansion valve (25) of the slave outdoor unit (2B) in deactivation is not opened, the refrigerant recovering means (63) opens the outdoor motor-operated expansion valve (25) for a set time.

Effects of Example 1

According to this example, since the gas stop valve (V2) is provided on the gas line (5GB) connecting to the slave outdoor unit (2B), the gas stop valve (V2) can be closed when the slave outdoor unit (2B) is deactivated during heating operation, thereby preventing a liquid refrigerant from storing in the slave outdoor unit (2B) in deactivation. This prevents lack of a circulation amount of refrigerant between the master outdoor unit (2A) and the indoor units (3A,3B).

Further, since the liquid stop valve (V1) is provided on the liquid line (5LB) connecting to the slave outdoor unit (2B), the liquid stop valve (V1) can be closed when the slave outdoor unit (2B) is deactivated during cooling operation and heating operation, thereby preventing a liquid refrigerant from being stored in the receiver (27) and the like.

As a result of this, a plurality of outdoor units (2A,2B) can be combined. In addition, since a plurality of outdoor units (2A,2B) having different capacities from each other can be produced and combined, this enables a few kinds of outdoor units (2A,2B) to cope with a plurality of indoor units (3A,3B).

Just after the slave door unit (2B) is deactivated during heating operation, the refrigerant ejecting means (61) operates so that the high-pressure gas refrigerant flows into the liquid line (5LB) through the slave outdoor unit (2B). Accordingly, the liquid refrigerant in the slave outdoor unit (2B) in deactivation is ejected into the main liquid line (41) or the like, thereby securely preventing lack of circulation amount of refrigerant.

When the refrigerant-amount detecting means (62) detects lack of a circulation amount of refrigerant, the refrigerant recovering means (63) throttles the indoor motor-operated expansion valve (33) to reduce the pressure of the liquid refrigerant to a saturation pressure according to an open-air temperature. As a result of this, the liquid refrigerant in the slave outdoor unit (2B) which is deactivated during heating operation is evaporated and returned to the master outdoor unit (2A). Accordingly, lack of a circulation amount of refrigerant can be securely prevented at any time.

Further, since piping connections between the outdoor units (2A,2B) and the indoor units (3A,3B) are formed into the single piping unit (11), an angle of tilt required for backing oil can be secured and a part of piping to be horizontally arranged can be securely held in a horizontal position. Accordingly, oil backing can be secured and a flash of liquid refrigerant can be prevented. This enables high-reliable air conditioning. In addition, since the number of pipes can be reduced when two outdoor units (2A,2B) are installed, this reduces the number of steps at a pipe arrangement, thereby simplifying the pipe arrangement.

EXAMPLE 2

Figure 2:
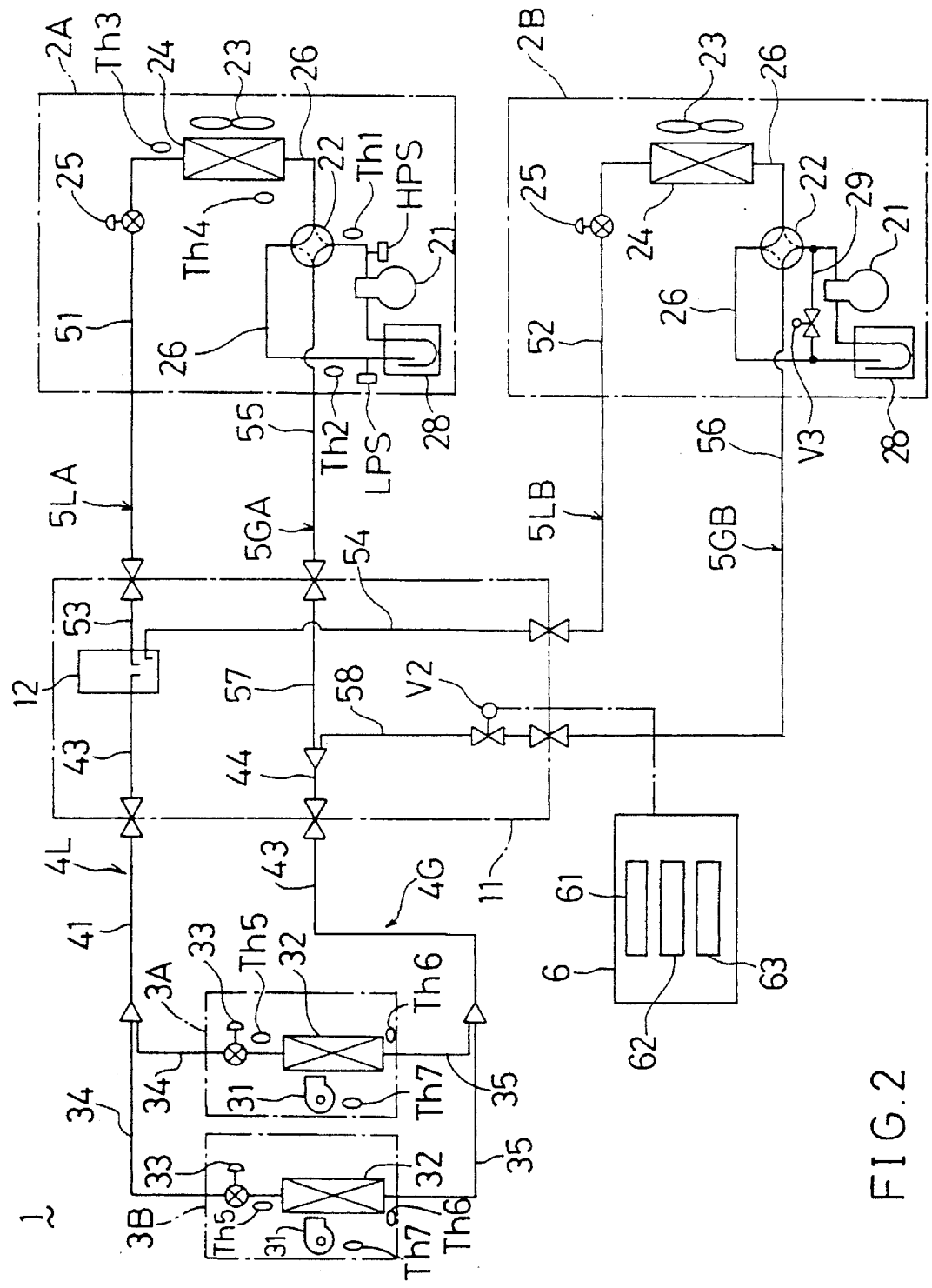
FIG. 2 is a refrigerant circuit diagram of an air conditioner showing Example 2 of a refrigeration apparatus of the present invention.

FIG. 2 shows another example of a refrigeration apparatus of the present invention. A single receiver (12) is provided in the piping unit (11). The receiver (12) is disposed at a connecting part between the main liquid passage (42) and the liquid passages (53,54) running to the outdoor units (2A,2B). The receiver (12) stores a liquid refrigerant, collects a liquid refrigerant from the outdoor units (2A,2B) to the main liquid line (4L) during cooling operation, and distributes a liquid refrigerant from the main liquid line (4L) to the outdoor units (2A,2B) during heating operation. In this example, the receivers (27) as shown in FIG. 1 are dispensed with, and the liquid stop valve (V1) is also dispensed with because the outdoor motor-operated expansion valve (25) is fully closed instead of the closure of the liquid stop valve (V1).

In this example, the controller (6) serves as a full-closure control means for fully closing the outdoor motor-operated expansion valve (25) of the slave outdoor unit (2B) when the slave outdoor unit (2B) is deactivated during refrigerating operation.

According to this example, since provision of the single receiver (12) can dispense with respective receivers in the outdoor units (2A,2B), this reduces the number of elements. Further, since distribution of a liquid refrigerant is securely carried out, an unbalanced flow of refrigerant can be securely prevented even when a flash of gas flows into the main liquid line (4L) or the like. Other constructions, operations and effects are the same as in Example 1 shown in FIG. 1.

Modification 1 of Example 2

Figure 3:
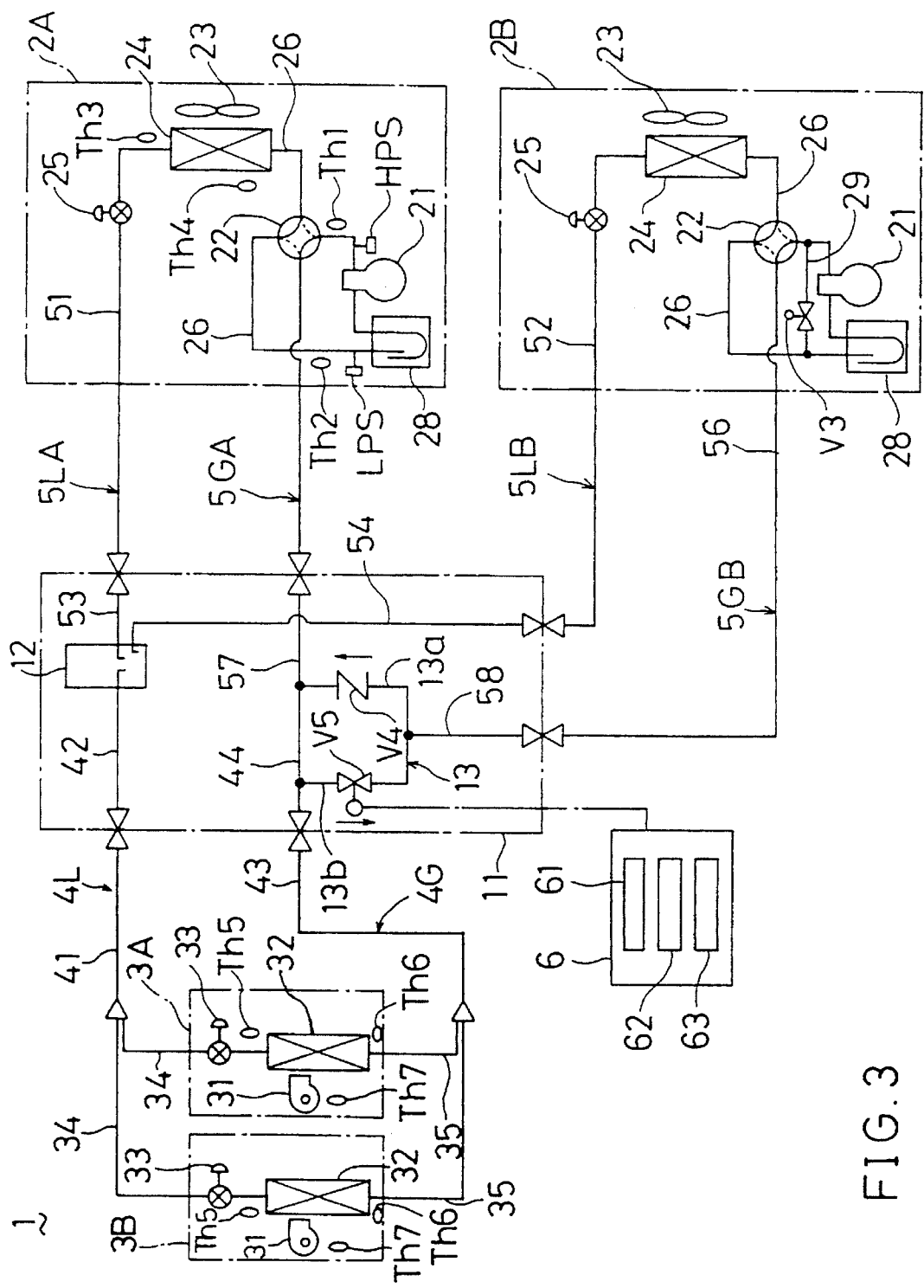
FIG. 3 is a refrigerant circuit diagram of an air conditioner showing a modification of the Example 2.

FIG. 3 is a valve circuit (13) showing a modification of the above gas stop valve (V2). The valve circuit (13) is composed of a first passage (13a) having a non-return valve (V4) through which a gas refrigerant flows from the slave outdoor unit (2B) into the main gas line (4G), and a second passage (13b) having a stop valve (V5) which opens at a cooling operation.

Modification 2 of Example 2

Figure 4:
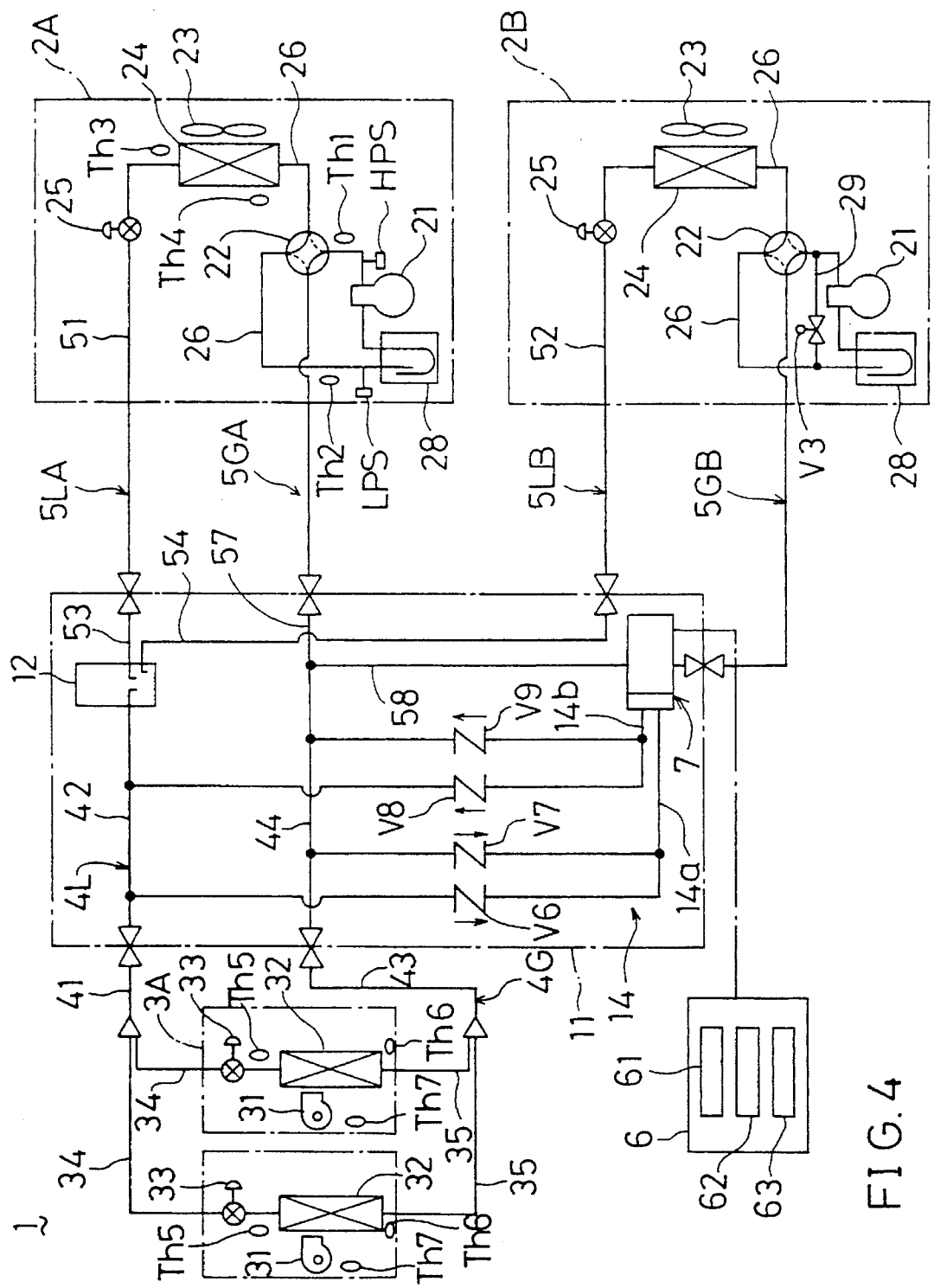
FIG. 4 is a refrigerant circuit diagram of an air conditioner showing another modification of the Example 2.

FIG. 4 is an external-equalizing-type reversible valve (7) showing another modification of the gas stop valve (V2). The external-equalizing-type reversible valve (7) is connected to a pilot circuit (14). The pilot circuit (14) is composed of: a high-pressure circuit (14a) which is connected to the main gas line (4G) and the main liquid line (4L), has non-return valves (V6,V7) and conducts a high-pressure refrigerant; and a low-pressure circuit (14b) which is connected to the main gas line (4G) and the main liquid line (4L), has non-return valves (V8,V9) and holds a low pressure state.

Figure 5:
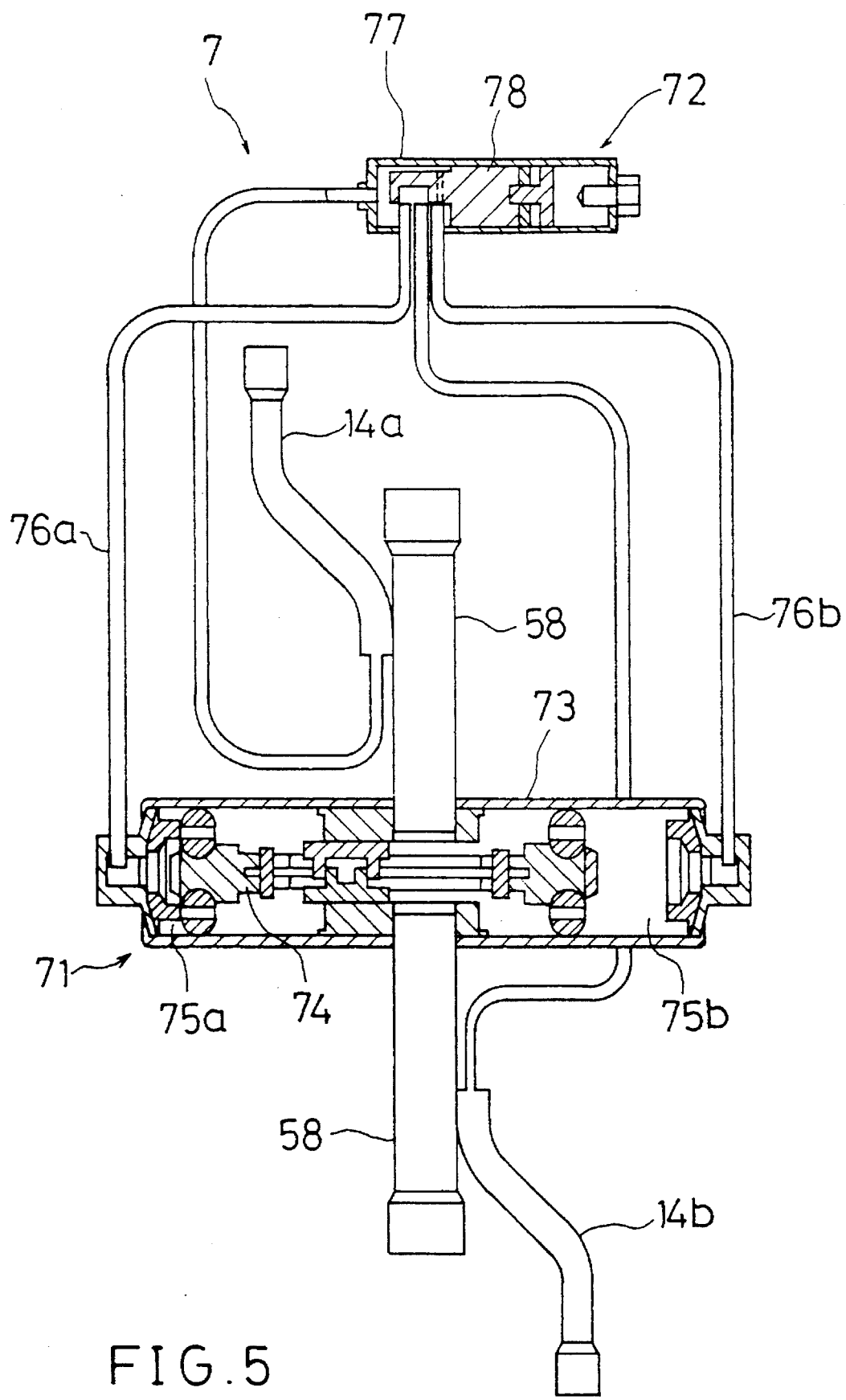
FIG. 5 is a sectional view showing than an external-equalizing-type reversible valve is opened.
Figure 6:
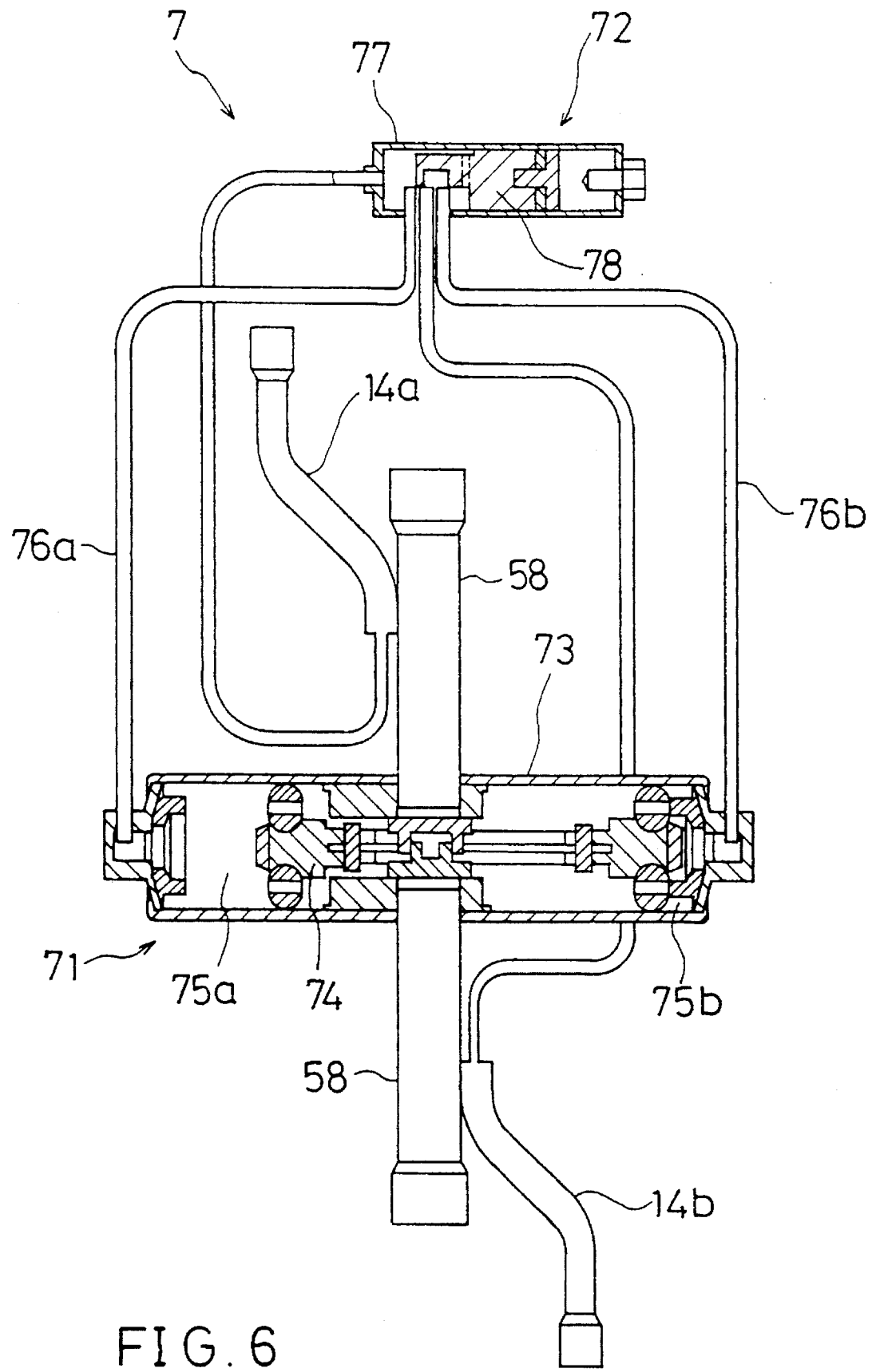
FIG. 6 is a sectional view showing that the external-equalizing-type reversible valve is closed.

As shown in FIG. 5 and FIG. 6, the external-equalizing-type reversible valve (7) has a valve base (71) and a pilot valve (72). The valve base (71) is composed of a casing (73), a spool (74) reciprocatably disposed in the casing (73) and pressure rooms (75a,75b) formed on both sides of the spool (74) in the casing (73). The valve base (71) is connected to the gas passage (58) on the slave outdoor unit's (2B) side and connected to two pilot pipes (76a,76b) through which the pressure rooms (75a,75b) are communicated with each other. The gas passage (58) is switched between a communicating state (see FIG. 5) and a closing state (see FIG. 6) by the movement of the spool (74).

The pilot valve (72) is composed of a casing (77) and a plunger (78) reciprocally disposed in the casing (77). In the pilot valve (72), the two pilot pipes (76a,76b) are connected to the high-pressure circuit (14a) and the low-pressure circuit (14b). The plunger (78) is moved by the control signals of the controller (6), so that the high-pressure gas or the low-pressure gas is led to the pressure rooms (75a,75b) thereby moving the spool (74). According to the movement of the spool (74), the gas passage (58) is communicated or shut off.

EXAMPLE 3

Figure 7:
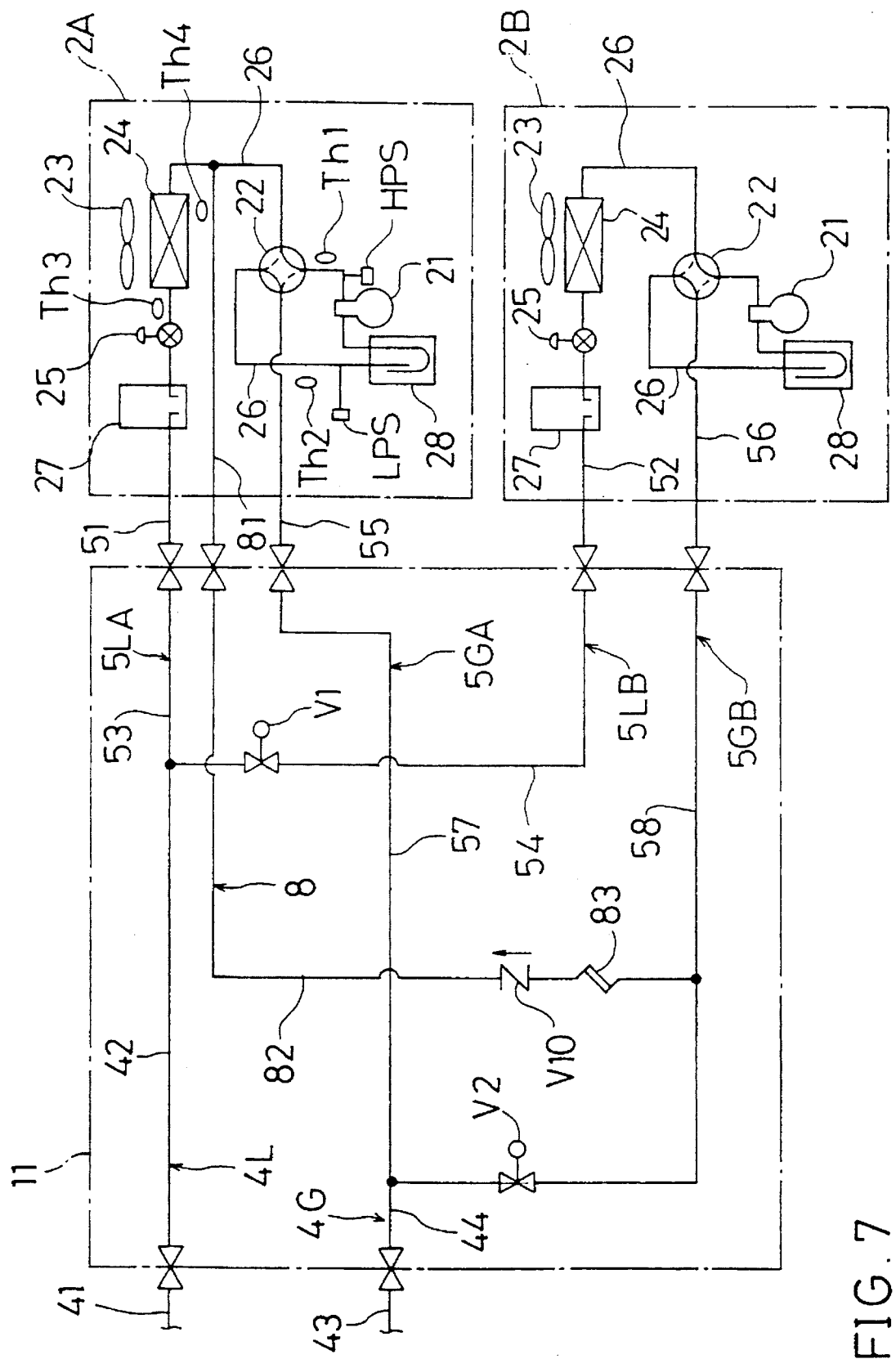
FIG. 7 is a refrigerant circuit diagram of an air conditioner showing Example 3 of a refrigeration apparatus of the present invention.

FIG. 7 shows another example of a refrigeration apparatus of the present invention. In this example, a refrigerant recovering line (8) is provided in addition to the air conditioner (1) shown in FIG. 1.

The refrigerant recovering line (8) is composed of a refrigerant recovering pipe (81) extending outward from the master outdoor unit (2A), and a refrigerant recovering passage (82) connected to an outer end of the refrigerant recovering pipe (81). An inner end of the refrigerant recovering pipe (81) is connected to the gas-refrigerant pipe (26) disposed between the outdoor heat exchanger (24) and the four-way selector valve (22) of the master outdoor unit (2A).

The refrigerant recovering passage (82) is connected at an outer end thereof to the gas passage (58) on the slave outdoor unit's (2B) side and has a capillary (73) and a non-return valve (V10) for allowing a refrigerant to flow from the gas passage (58) to the master outdoor unit (2A). Further, in the refrigerant recovering line (8), the refrigerant recovering passage (82), the capillary (83), and the non-return valve (V10) are unitized with the piping unit (11) so as to be incorporated thereinto.

Thus, since the refrigerant recovering line (8) is incorporated into the piping of the air conditioner (1), when the slave outdoor unit (2B) is deactivated during heating operation, the refrigerant recovering line (8) establishes communications between the gas passage (58) connecting to the slave outdoor unit (2B) and a low-pressure gas side of the master outdoor unit (2A). Accordingly, a liquid refrigerant can be prevented from being stored into the slave outdoor unit (2B). In addition, since the refrigerant ejecting means (61) and the refrigerant recovering means (63) as in the example shown in FIG. 1 can be dispensed with, the construction of the air conditioner (1) can be simplified. Other constructions, operations, and effects are the same as in Example 1 shown in FIG. 1.

Modification of Example 3

Figure 8:
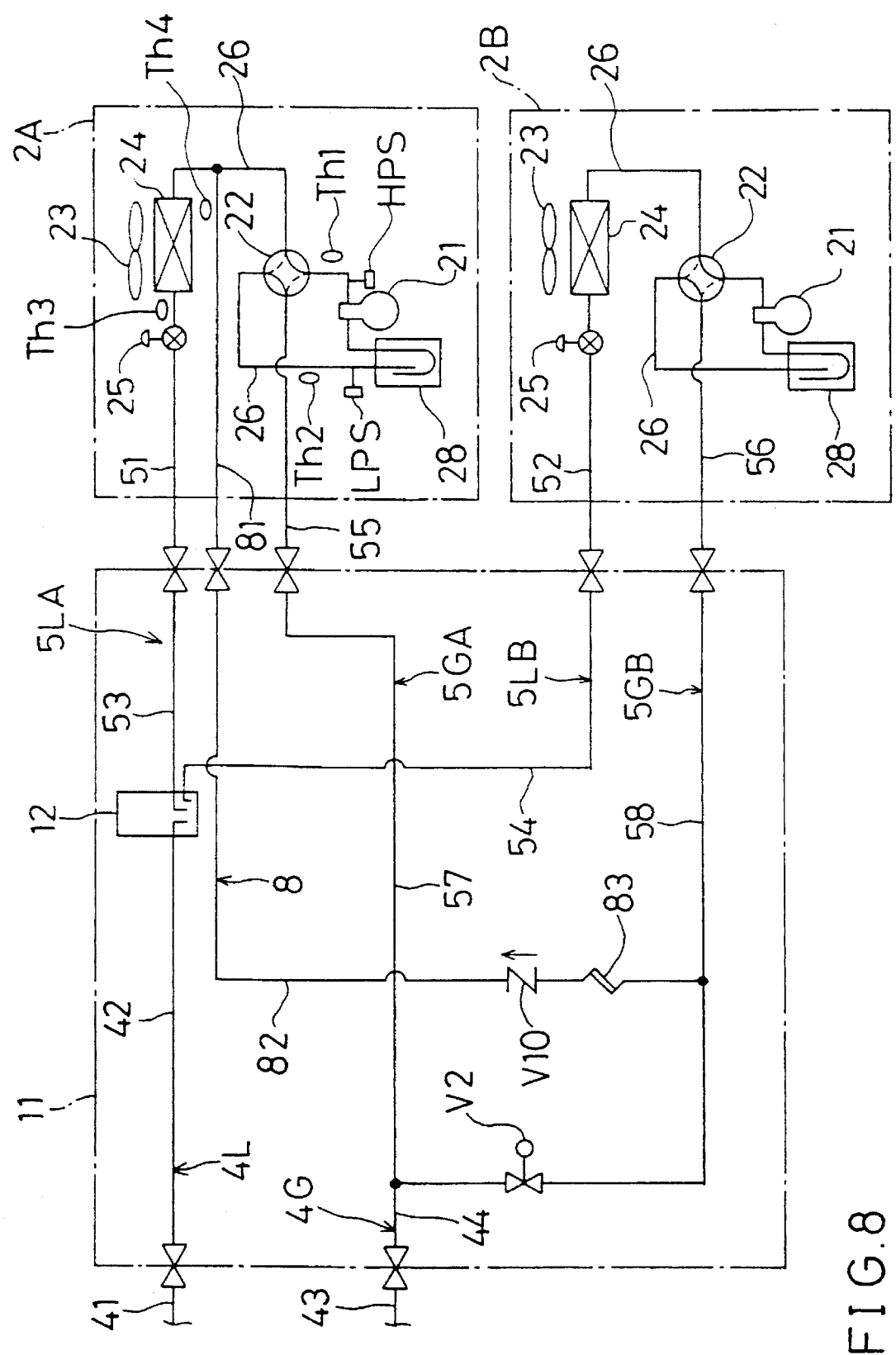
FIG. 8 is a refrigerant circuit diagram of an air conditioner showing a modification of the Example 3.

FIG. 8 shows a modification of Example 3 shown in FIG. 7. A single receiver (12) is provided in the piping unit (11). The receiver (12) is disposed at a connecting part between the main liquid passage (42) and the liquid passages (53,54) running to the outdoor units (2A,2B). The receiver (12) stores a liquid refrigerant, collects a liquid refrigerant from the outdoor units (2A,2B) to the main liquid line (4L) during cooling operation, and distributes a liquid refrigerant from the main liquid line (4L) to the outdoor units (2A,2B) during heating operation. In this example, the receivers (27) as shown in FIG. 7 are dispensed with, and the liquid stop valve (V1) is also dispensed with because the outdoor motor-operated expansion valve (25) is fully closed instead of the closure of the liquid stop valve (V1).

EXAMPLE 4

Figure 9:
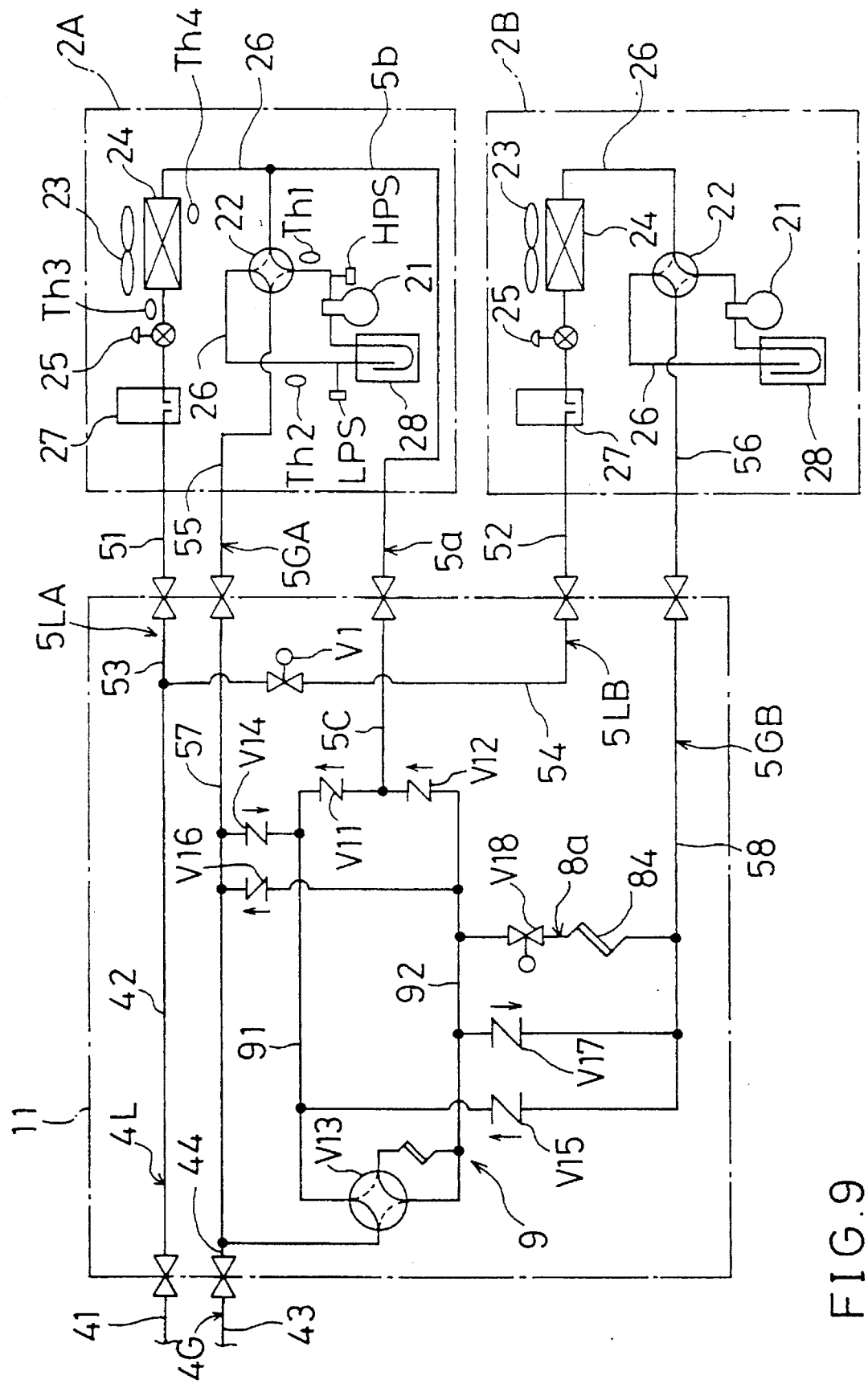
FIG. 9 is a refrigerant circuit diagram of an air conditioner showing Example 4 of a refrigeration apparatus of the present invention.

FIG. 9 shows still another example of the air conditioner (1), that is, an example of refrigeration apparatus of the present invention. This example is so composed that a branch line (5a) and a constant-pressure circuit (9) are provided in the air conditioner (1) shown in FIG. 1. The branch line (5a) is composed of a branch pipe (5b) extending outward from the master outdoor unit (2A), and a branch passage (5c) connected to an outer end of the branch pipe (5b). An inner end of the branch pipe (5b) is connected to the gas-refrigerant pipe (26) disposed between the outdoor heat exchanger (24) and the four-way selector valve (22) of the master outdoor unit (2A). An outer end of the branch passage (5c) is connected to the constant-pressure circuit (9).

The constant-pressure circuit (9) has a normally high-pressure passage (91) and a normally low-pressure passage (92). One end of the normally high-pressure passage (91) and one end of the normally low-pressure passage (92) are connected to the branch passage (5c) via non-return valves (V11,V12) respectively, and respective other ends of the normally high-pressure passage (91) and the normally low-pressure passage (92) are connected to the main gas passage (44) of the main gas line (4G) via a four-way selector valve (V13). The non-return valve (V11) of the normally high-pressure passage (91) is composed so as to allow a refrigerant to flow from the branch passage (5c) to the normally high-pressure passage (91), and the non-return valve (V12) of the normally low-pressure passage (92) is composed so as to allow a refrigerant to flow from the normally low-pressure passage (92) to the branch passage (5c). The four-way selector valve (V13) is switched as shown in dash lines at a cooling operation to conduct a low-pressure gas refrigerant into the normally low-pressure passage (92), and switched as shown in solid lines at a heating operation to conduct a high-pressure gas refrigerant into the normally high-pressure passage (91). The normally high-pressure passage (91) is connected to the main gas passage (44) and the gas passage (58) running to the slave outdoor unit (2B) through non-return valves (V14,V15) for allowing a refrigerant to flow into the normally high-pressure passage (91), so that the normally high-pressure passage (91) is held in a high-pressure state at any time. The normally low-pressure passage (92) is connected to the main gas passage (44) and the gas passage (58) running to the slave outdoor unit (2B) through non-return valves (V16,V17) for allowing a refrigerant to flow into the main gas passage (44) and the gas passage (58), so that the normally low-pressure passage (92) is held in a low-pressure state at any time.

A refrigerant recovering passage (8a) is connected between the normally low-pressure passage (92) and the gas passage (58) running to the slave outdoor unit (2B). In the refrigerant recovering passage (8a), a capillary (84) and a stop valve (V18) are provided. The stop valve (V18) is composed so as to open when the slave outdoor unit (2B) is deactivated during heating operation.

The constant-pressure circuit (9), the branch passage (5c), the refrigerant recovering passage (8a), the capillary (84), and the stop valve (V18) are unitized with the piping unit (11) so as to be incorporated thereinto.

In this example, since the gas passage (57) running to the master outdoor unit (2A) is directly connected to the main gas passage (44), the gas stop valve (V2) as shown in FIG. 1 is dispensed with.

According to this example, since the constant-pressure circuit (9) and the refrigerant recovering passage (8a) is incorporated into the piping of the air conditioner (1), when the slave outdoor unit (2B) is deactivated during heating operation, the normally low-pressure passage (92) and the refrigerant recovering passage (8a) establish communications between the gas passage (58) running to the slave outdoor unit (2B) and a low-pressure gas side of the master outdoor unit (2A). Accordingly, a liquid refrigerant is prevented from being stored into the slave outdoor unit (2B). Further, since the gas stop valve (V2) as shown in FIG. 7 is dispensed with, the number of elements can be reduced.

In addition, since the refrigerant ejecting means (61) and the refrigerant recovering means (63) as shown in the example of FIG. 1 can be dispensed with, the construction of the refrigeration apparatus can be simplified. Other constructions, operations, and effects are the same as in example shown in FIG. 1.

In this example, since the stop valve (V18) is closed during heating operation of the slave outdoor unit (2B), operation performance in heating is improved as compared with the case that the non-return valve (V10) as in Example 3 is used. However, the stop valve (V18) may be dispensed with, though the operation performance in heating is slightly lowered.

Modification of Example 4

Figure 10:
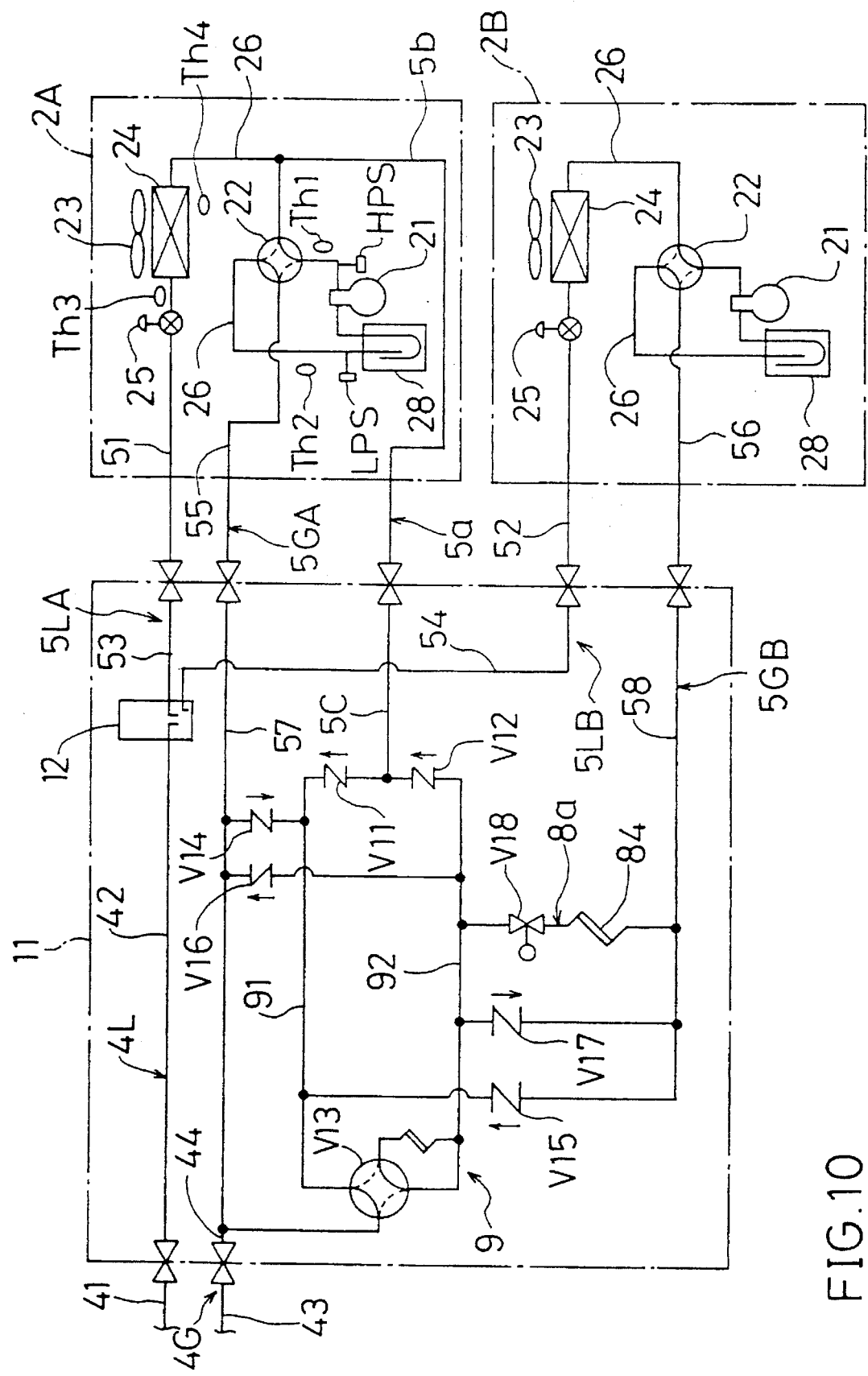
FIG. 10 is a refrigerant circuit diagram of an air conditioner showing a modification of the Example 4.

FIG. 10 shows a modification of Example 4 shown in FIG. 9. A single receiver (12) is provided in the piping unit (11). The receiver (12) is disposed at a connecting part between the main liquid passage (42) and the liquid passages (53,54) running to the outdoor units (2A,2B). The receiver (12) stores a liquid refrigerant, collects a liquid refrigerant from the outdoor units (2A,2B) to the main liquid line (4L) during cooling operation, and distributes a liquid refrigerant from the main liquid line (4L) to the outdoor units (2A,2B) during heating operation. In this example, the receivers (27) as shown in FIG. 9 are dispensed with, and the liquid stop valve (V1) is also dispensed with because the outdoor motor-operated expansion valve (25) is fully closed instead of the closure of the liquid stop valve (V1).

EXAMPLE 5

Figure 11:
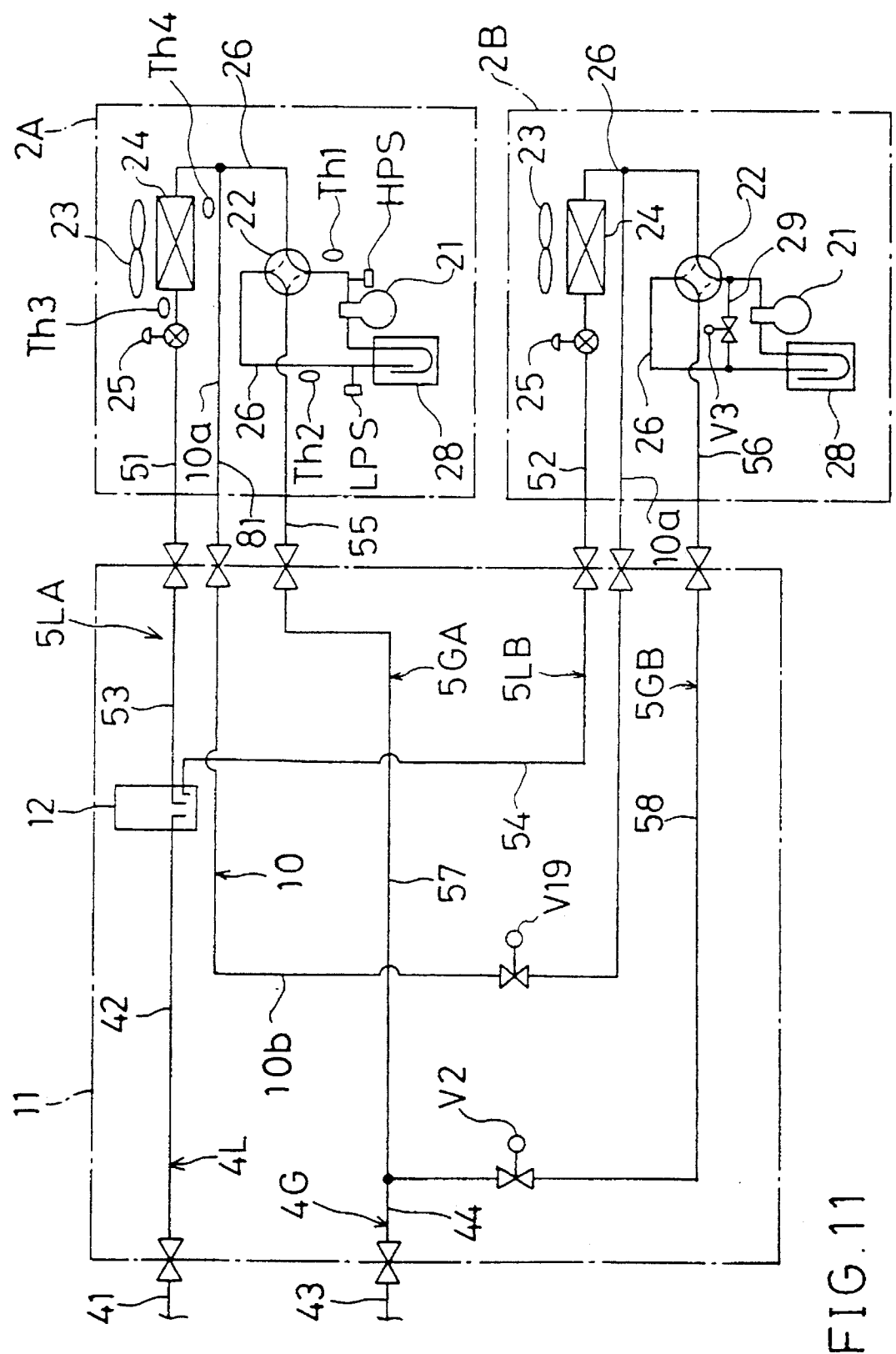
FIG. 11 is a refrigerant circuit diagram of an air conditioner showing Example 5 of a refrigeration apparatus of the present invention.

FIG. 11 shows still another example of the air conditioner (1), that is, an example of the refrigeration apparatus of the present invention. This example is so composed that a connecting as line (10) is provided in the air conditioner (1) shown in FIG. 2.

The connecting gas line (10) is connected at an end thereof to the gas-refrigerant pipe (26) extending from the outdoor heat exchanger (24) of the master outdoor unit (2A) and connected at the other end to the gas-refrigerant pipe (26) extending from the outdoor heat exchanger (24) of the slave master outdoor unit (2B). The connecting as line (10) is composed of connecting gas pipes (10a) extending outward from the respective outdoor units (2A,2B), a connecting gas passage (10b) connected at both ends thereof to respective outer ends of the connecting gas pipes (10a), and a stop valve (V19) disposed in the connecting gas passage (10b). The stop valve (V19) is a closing mechanism for fully closing, when the slave outdoor unit (2B) is deactivated during cooling operation, to prevent a refrigerant from flowing into the slave outdoor unit (2B).

The connecting gas passage (10b) and the stop valve (V19) are unitized with the piping unit (11) so as to be incorporated thereinto.

In either of cooling and heating operations, the stop valve (V19) is opened in the running of both the outdoor units (2A,2B). Thus, a high-pressure gas refrigerant flows through both the outdoor heat exchangers (24) uniformly during cooling operation and a low-pressure gas refrigerant flows through both the outdoor heat exchangers (24) uniformly during heating operation.

For example, when an operating capacity of the slave outdoor unit (2B) is large with respect to a load thereof, a part of the refrigerant discharged from the compressor (21) of the slave outdoor unit (2B) flows into the outdoor heat exchanger (24) of the master outdoor unit (2A) via the connecting gas line (10).

When the slave outdoor unit (2B) is deactivated during cooling operation, the stop valve (V19) is fully closed and the gas stop valve (V2) is opened, so that the refrigerant in the slave outdoor unit (2B) is sucked into a low-pressure side of the master outdoor unit (2A). When the slave outdoor unit (2B) is deactivated during heating operation, the stop valve (V19) is opened and the gas stop valve (V2) is fully closed, so that the refrigerant in the slave outdoor unit (2B) is sucked into a low-pressure side of the master outdoor unit (2A) via the connecting gas line (10).

According to this example, since the gas-refrigerant pipe (26) of the outdoor heat exchanger (24) of the master outdoor unit (2A) is communicated with the gas-refrigerant pipe (26) of the outdoor heat exchanger (24) of the slave outdoor unit (2B), circulation amounts of refrigerants which flow through the respective outdoor heat exchangers (24) can be approximately equal to each other, thereby increasing a coefficient of performance (COP) of the refrigeration apparatus. In addition, between the outdoor units (2A,2B), a high-pressure sensor for detecting a high pressure at a cooling operation and a low-pressure sensor for detecting a low pressure at a heating operation can be shared. This reduces the number of elements. Further, when the slave outdoor unit (2B) is deactivated during heating operation, the refrigerant in the slave thermal source unit (2B) in deactivation can be securely returned to the master outdoor unit (2A). Other constructions, operations, and effects are the same as Example 2 shown in FIG. 2.

Modification of Example 5

Figure 12:
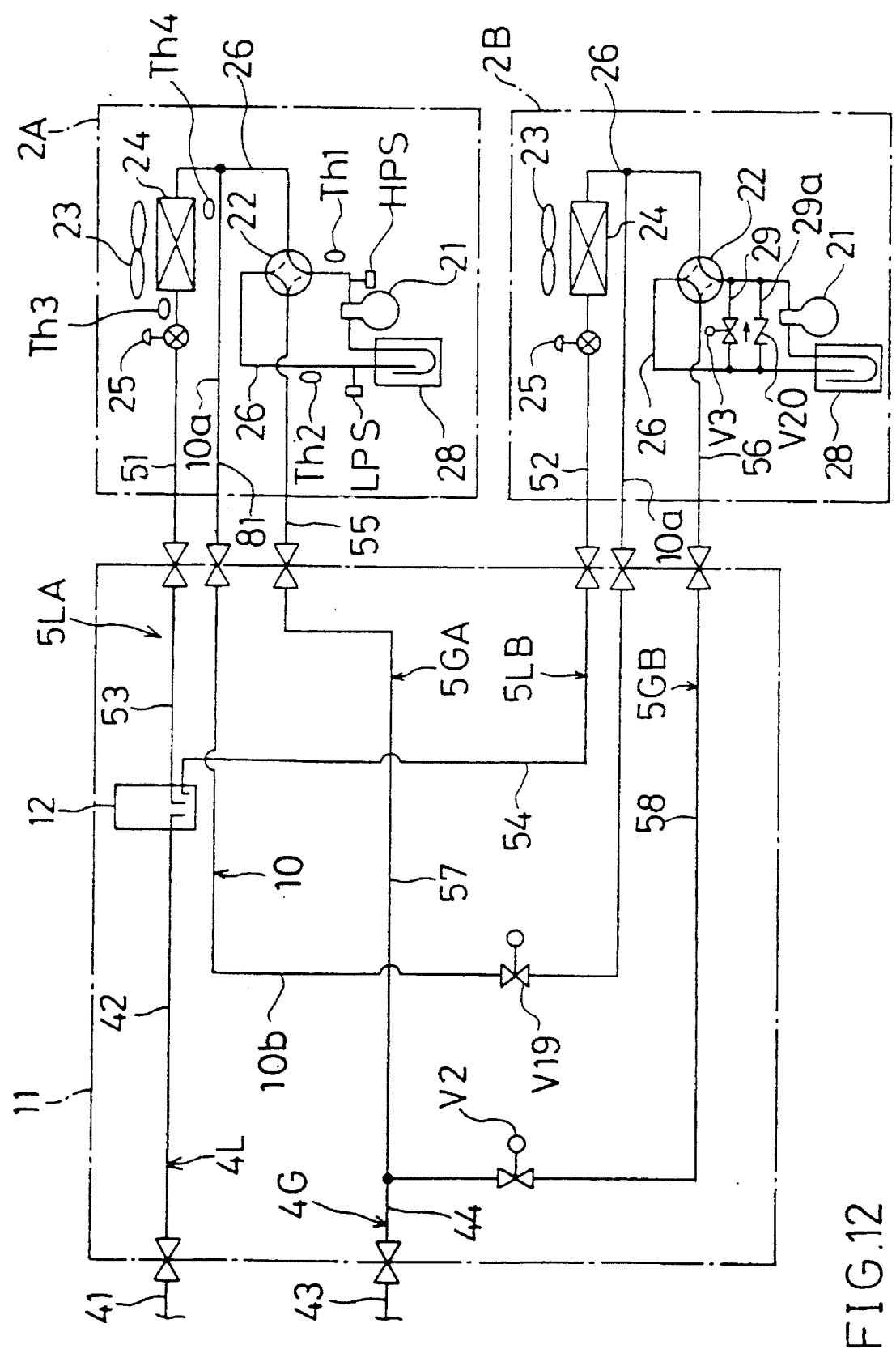
FIG. 12 is a refrigerant circuit diagram of an air conditioner showing a modification of the Example 5.

FIG. 12 shows a modification of the above Example 5. In this example, an auxiliary bypass line (29a) is arranged in parallel with the bypass line (29).

On the auxiliary bypass line (29a), a non-return valve (V20) is provided for allowing a refrigerant to flow from the inlet side to the discharge side of the compressor (21).

When the slave outdoor unit (2B) is deactivated during heating operation, the refrigerant in the slave outdoor unit (2B) is sucked into a low-pressure side of the master outdoor unit (2A) via the connecting gas line (10), as explained in the above Example 5. At this time, the four-way selector valve (22) may be in a state of a cooling operation as shown in solid lines in FIG. 12. In such a case, when the bypass stop valve (V3) of the bypass line (29) is a one-way valve for allowing a refrigerant to flow from the discharge side to the inlet side of the compressor (21), the refrigerant shows through compressor (21). Therefore, the auxiliary bypass line (29a) is provided in the slave outdoor units (2B) to securely suck the refrigerant into the master outdoor unit (2A).

Other Modifications

Each of the air conditioners (1) of the above examples is composed of two outdoor units (2A,2B) and two indoor units (3A,3B). The air conditioner of the present invention may be composed of three or more outdoor units and three or more indoor units. In such a case, one of the plural outdoor units serves as a master outdoor unit.

In the example of FIG. 1, the receiver (12) may be disposed at a connecting part between the main liquid passage (42) and the liquid passages (53,54) extending toward the outdoor units (2A,2B), as shown in FIG. 2. According to this, storage of a refrigerant in case of the air conditioner having long piping length is prevented. In the example of FIG. 1, the refrigerant-amount detecting means (62) is composed so as to detect lack of a circulation amount of refrigerant based on the opening of the outdoor motor-operated expansion valve (25) and superheating degree. However, the refrigerant-amount detecting means (62) may be composed so as to detect lack of a circulation amount of refrigerant when an evaporation temperature of a refrigerant in the outdoor heat exchanger (24) is lower by a set degree than an open-air temperature.

In the example of FIG. 1, the refrigerant recovering means (63) is composed so as to recover a refrigerant for a set time. However, a pressure sensor is disposed on the compressor's (21) side of the outdoor heat exchanger (24) or the like in the slave outdoor unit (2B), and the refrigerant recovering means (63) may be composed so as to finish the recover of the refrigerant when the pressure sensor detects that the pressure of the refrigerant is decreased to a set pressure.

In the examples of FIG. 2, FIG. 3, FIG. 4, FIG. 8, and FIG. 10, the liquid stop valve (V1) is dispensed with, for the reason that the outdoor motor-operated expansion valve (25) can be freely opened and closed. However, in case of using a valve which cannot be freely opened and closed such as an automatic expansion valve, the liquid stop valve (V1) is provided for preventing storage of a refrigerant, as shown in FIG. 1 and the like.

In the examples of FIG. 1 and the like, the bidirectional bypass stop valve (V3) is provided. However, as shown in FIG. 12, a one-way bypass stop valve (V3) and an auxiliary bypass line (29a) may be provided.

In the above examples, description is made about an air conditioner which is operated reversibly between cooling and heating cycles. The air conditioner may be an air conditioner only for cooling. In such a case, the four-way selector valve (22) and the outdoor motor-operated expansion valve (25) each shown in FIG. 1 and the gas stop valve (V2) are dispensed with. When the slave outdoor unit (2B) is deactivated during cooling operation, the liquid stop valve (V1) is fully closed.

Further, in the air conditioner only for cooling, as shown in FIG. 2, the receiver (12) may be disposed at a connecting part between the main liquid passage (42) and the liquid passages (53,54) extending toward the outdoor units (2A, 2B).

Industrial Applicability

As described above, according to the refrigeration apparatus of the present invention, a plurality of outdoor units can be provided and effective cooling and heating operations can be made by using the outdoor units. Accordingly, the refrigeration apparatus of the present invention is suitable for air conditioning for a large building or the like.

I claim:

1. A refrigeration apparatus, comprising:

liquid lines, gas lines, a main liquid line, a main gas line;

a main thermal source unit and a slave thermal source unit each having a compressor, a thermal-source-side heat exchanger connected at one end thereof to exchangeably a discharge side and an inlet side of the compressor and at the other end thereof to the corresponding liquid line and a thermal-source-side heat expansion mechanism which is disposed on the corresponding liquid line and is capable of regulating an opening thereof, each compressor being exchangeably connected at the discharge side and the inlet side thereof to the corresponding gas line;

a connecting circuit part for connecting respective outer ends of the liquid lines and of the gas lines to the main liquid line and the main gas line respectively so that the thermal source units are arranged in parallel with each other;

a plurality of user units having a user-side heat exchanger and being connected in parallel to the main liquid line and the main gas line;

a receiver for connecting liquid lines and the main liquid line;

a gas-line closing mechanism provided at the gas line on the side of the slave thermal source unit; and a controller for controlling the gas line closing mechanism of the slave thermal source unit to be fully closed when the slave thermal source unit halts its heating operation under the condition that the main thermal source unit continues its operation, and for controlling the thermal-source-side heat expansion mechanism of the slave thermal source unit to be fully closed when the slave thermal source unit halts its operations under the condition that the main thermal source unit continues its operation.

2. The refrigeration apparatus according to claim 1, further comprising:

a bypass line (29) which bypasses the compressor (21) of the slave thermal source unit (2B) and which is connected to the discharge and inlet sides of the compressor (21);

a bypass closing mechanism (V3) disposed on the bypass line (29); and refrigerant ejecting means (61) for ejecting a liquid refrigerant remaining in the slave thermal source unit (2B) in such a manner as to open the bypass closing mechanism (V3) and the thermal-source-side expansion mechanism (25) each included in the slave thermal source unit (2B) in deactivation, and the gas-line closing mechanism (V2) for a set time just after the slave thermal source unit (2B) is deactivated during heating operation.

3. The refrigeration apparatus according to claim 1 or 2, further comprising:

a user-side expansion mechanism (33) which is disposed in each of the user units (3A, 3B) and located between the main liquid line (4L) and the user-side heat exchanger (32);

refrigerant-amount detecting means (62) for detecting lack of a circulation amount of refrigerant; and refrigerant recovering means (63) for recovering a refrigerant from the slave thermal source unit (2B) in deactivation when the slave thermal source unit (2B) is deactivated during heating operation and the refrigerant-amount detecting means (62) detects the lack of a circulation amount of refrigerant, in such a manner as to open the thermal-source-side expansion mechanism (25) of the slave thermal source unit (2B) in deactivation and throttle the user-side expansion mechanism (33) so as to reduce a pressure of the liquid refrigerant to a saturation pressure according to an open-air temperature.

4. The refrigeration apparatus according to claim 1, wherein a refrigerant recovering line (8) through which a refrigerant flows from the slave thermal source unit (2B) to the master thermal source unit (2A) is connected between a gas-refrigerant pipe (26) extending from the thermal-source-side heat exchanger (24) of the master thermal source unit (2A) and the gas line (5GB) extending from the slave thermal source unit (2B).

5. The refrigeration apparatus according to claim 1, further comprising:

a connecting gas line (10) which is connected at respective ends thereof to the respective gas-refrigerant pipes (26) of the thermal-source-side heat exchangers (24) of the thermal source units (2A, 2B) and which has a closing mechanism (V19) for preventing a refrigerant from flowing, when at least one thermal source unit (2B) is deactivated during cooling operation, into the thermal source unit (2B) in deactivation.

6. The refrigeration apparatus according to any of claims 1, 4 and 5, wherein the connecting circuit part (11) is formed in a single unit.

7. The refrigeration apparatus according to claim 2, wherein the bypass line (29) comprises an auxiliary bypass line (29a) having a non-return valve which allows a refrigerant to flow from the inlet side to the discharge side to the compressor (21), the auxiliary bypass line (29a) being connected between the inlet side and the discharge side of the compressor (21), bypassing the compressor (21).

8. A refrigeration apparatus, comprising:

a master thermal source unit having a compressor, a thermal-source-side heat exchanger connected at an end thereof to the discharge side and the inlet side of the compressor so as to be switchable between the two sides of the compressor and connected at the other end to a liquid line, and a thermal-source-side expansion mechanism which is disposed on the liquid line and capable of regulating an opening thereof, in which a gas line is connected to the discharge side and the inlet side of the compressor so as to be switchable between the two sides of the compressor;

a slave thermal source unit having a compressor, a thermal-source-side heat exchanger connected at an end thereof to the discharge side and the inlet side of the compressor so as to be switchable between the two sides of the compressor and connected at the other end to a liquid line, and a thermal-source-side expansion mechanism which is disposed on the liquid line and capable of regulating an opening thereof, in which a gas line is connected to the discharge side and the inlet side of the compressor so as to be switchable between the two sides of the compressor;

a connecting circuit part for connecting outer ends of the liquid lines and outer ends of the gas lines to a main liquid line and a main gas line respectively so that the thermal source units are arranged in parallel with each other;

a plurality of user units which each have a user-side heat exchanger and which are connected to the main liquid line and the main gas line so as to be arranged in parallel with one another;

a receiver which is disposed at a connecting part located between the liquid lines and the main liquid line and connects each of the liquid lines to the main liquid line;

a gas-line closing mechanism which is disposed on the gas line extending toward the slave thermal source unit and fully closed when the slave thermal source unit is deactivated during heating operation;

full-closure control means for controlling the thermal-source-side expansion mechanism of the slave thermal source unit in deactivation to be fully closed when the slave thermal source unit is deactivated during refrigerating operation;

a bypass line which bypasses the compressor of the slave thermal source unit and which is connected to the discharge and inlet sides of the compressor;

a bypass line closing mechanism disposed on the bypass line; and refrigerant ejecting means for ejecting a liquid refrigerant remaining in the slave thermal source unit in such a manner as to open the bypass closing mechanism and the thermal-source-side expansion mechanism each included in the slave thermal source unit in deactivation, and the gas-line closing mechanism for a set time just after the slave thermal source unit is deactivated during heating operation.

9. The refrigeration apparatus according to claim 8, further comprising:

a user-side expansion mechanism which is disposed in each of the user units and located between the main liquid line and the user-side heat exchanger;

refrigerant-amount detecting means for detecting lack of a circulation amount of refrigerant; and refrigerant recovering means for recovering a refrigerant from the slave thermal source unit in deactivation when the slave thermal source unit is deactivated during heating operation and the refrigerant-amount detecting means detects the lack of a circulation amount of refrigerant, in such a manner as to open the thermal-source-side expansion mechanism of the slave thermal source unit in deactivation and throttle the user-side expansion mechanism of the slave thermal source unit in deactivation and throttle the user-side expansion mechanism so as to reduce a pressure of the liquid refrigerant to a saturation pressure according to an open-air temperature.

10. The refrigeration apparatus according to claim 8, wherein the bypass line comprises an auxiliary bypass line having a non-return valve which allows a refrigerant to flow from the inlet side to the discharge side to the compressor, the auxiliary bypass line being connected between the inlet side and the discharge side of the compressor, bypassing the compressor.

11. A refrigeration apparatus, comprising:

a master thermal source unit having a compressor, a thermal-source-side heat exchanger connected at an end thereof to the discharge side and the inlet side of the compressor so as to be switchable between the two sides of the compressor and connected at the other end to a liquid line, and a thermal-source-side expansion mechanism which is disposed on the liquid line and capable of regulating an opening thereof, in which a gas line is connected to the discharge side and the inlet side of the compressor so as to be switchable between the two sides of the compressor;

a slave thermal source unit having a compressor, a thermal-source-side heat exchanger connected at an end thereof to the discharge side and the inlet side of the compressor so as to be switchable between the two sides of the compressor and connected at the other end to a liquid line, and a thermal-source-side expansion mechanism which is disposed on the liquid line and capable of regulating an opening thereof, in which a gas line is connected to the discharge side and the inlet side of the compressor so as to be switchable between the two sides of the compressor;

a connecting circuit part for connecting outer ends of the liquid lines and outer ends of the gas lines to a main liquid line and a main gas line respectively so that the thermal source units are arranged in parallel with each other;

a plurality of user units which each have a user-side heat exchanger and which are connected to the main liquid line and the main gas line so as to be arranged in parallel with one another;

a receiver which is disposed at a connecting part located between the liquid lines and the main liquid line and connects each of the liquid lines to the main liquid line;

a gas-line closing mechanism which is disposed on the gas line extending toward the slave thermal source unit and fully closed when the slave thermal source unit is deactivated during heating operation;

full-closure control means for controlling the thermal-source-side expansion mechanism of the slave thermal source unit in deactivation to be fully closed when the slave thermal source unit is deactivated during refrigerating operation;

a user-side expansion mechanism which is disposed in each of the user units and located between the main liquid line and the user-side heat exchanger;

refrigerant-amount detecting means for detecting lack of a circulation amount of refrigerant; and refrigerant recovering means for recovering a refrigerant from the slave thermal source unit in deactivation when the slave thermal source unit is deactivated during heating operation and the refrigerant-amount detecting means detects the lack of a circulation amount of refrigerant, in such a manner as to open the thermal-source-side expansion mechanism of the slave thermal source unit in deactivation and throttle the user-side expansion mechanism of the slave thermal source unit in deactivation and throttle the user-side expansion mechanism so as to reduce a pressure of the liquid refrigerant to a saturation pressure according to an open-air temperature.

12. A refrigeration apparatus, comprising:

a master thermal source unit having a compressor, a thermal-source-side heat exchanger connected at an end thereof to the discharge side and the inlet side of the compressor so as to be switchable between the two sides of the compressor and connected at the other end to a liquid line, and a thermal-source-side expansion mechanism which is disposed on the liquid line and capable of regulating an opening thereof, in which a gas line is connected to the discharge side and the inlet side of the compressor so as to be switchable between the two sides of the compressor;

a slave thermal source unit having a compressor, a thermal-source-side heat exchanger connected at an end thereof to the discharge side and the inlet side of the compressor so as to be switchable between the two sides of the compressor and connected at the other end to a liquid line, and a thermal-source-side expansion mechanism which is disposed on the liquid line and capable of regulating an opening thereof, in which a gas line is connected to the discharge side and the inlet side of the compressor so as to be switchable between the two sides of the compressor;

a connecting circuit part for connecting outer ends of the liquid lines and outer ends of the gas lines to a main liquid line and a main gas line respectively so that the thermal source units are arranged in parallel with each other;

a plurality of user units which each have a user-side heat exchanger and which are connected to the main liquid line and the main gas line so as to be arranged in parallel with one another;

a receiver which is disposed at a connecting part located between the liquid lines and the main liquid line and connects each of the liquid lines to the main liquid line;

a gas-line closing mechanism which is disposed on the gas line extending toward the slave thermal source unit and fully closed when the slave thermal source unit is deactivated during heating operation; and full-closure control means for controlling the thermal-source-side expansion mechanism of the slave thermal source unit in deactivation to be fully closed when the slave thermal source unit is deactivated during refrigerating operation;

wherein a refrigerant recovering line through which a refrigerant flows from the slave thermal source unit to the master thermal source unit is connected between a gas-refrigerant pipe extending from the thermal-source-side heat exchanger of the master thermal source unit and the gas line extending from the slave thermal source unit.

13. The refrigeration apparatus according to claim 12, wherein the connecting circuit part is formed in a single unit.

14. A refrigeration apparatus, comprising:

a master thermal source unit having a compressor, a thermal-source-side heat exchanger connected at an end thereof to the discharge side and the inlet side of the compressor so as to be switchable between the two sides of the compressor and connected at the other end to a liquid line, and a thermal-source-side expansion mechanism which is disposed on the liquid line and capable of regulating an opening thereof, in which a gas line is connected to the discharge side and the inlet side of the compressor so as to be switchable between the two sides of the compressor;

a slave thermal source unit having a compressor, a thermal-source-side heat exchanger connected at an end thereof to the discharge side and the inlet side of the compressor so as to be switchable between the two sides of the compressor and connected at the other end to a liquid line, and a thermal-source-side expansion mechanism which is disposed on the liquid line and capable of regulating an opening thereof, in which a gas line is connected to the discharge side and the inlet side of the compressor so as to be switchable between the two sides of the compressor;

a connecting circuit part for connecting outer ends of the liquid lines and outer ends of the gas lines to a main liquid line and a main gas line respectively so that the thermal source units are arranged in parallel with each other;

a plurality of user units which each have a user-side heat exchanger and which are connected to the main liquid line and the main gas line so as to be arranged in parallel with one another;

a receiver which is disposed at a connecting part located between the liquid lines and the main liquid line and connects each of the liquid lines to the main liquid line;

a gas-line closing mechanism which is disposed on the gas line extending toward the slave thermal source unit and fully closed when the slave thermal source unit is deactivated during heating operation;

full-closure control means for controlling the thermal-source-side expansion mechanism of the slave thermal source unit in deactivation to be fully closed when the slave thermal source unit is deactivated during refrigerating operation; and a connecting gas line which is connected at respective ends thereof to the respective gas-refrigerant pipes of the thermal-source-side heat exchangers of the thermal source units and which has a closing mechanism for preventing a refrigerant from flowing, when at least one thermal source unit is deactivated during cooling operation, into the thermal source unit in deactivation.

15. The refrigeration apparatus according to claim 14, wherein the connecting circuit part is formed in a single unit.

16. A refrigeration apparatus, comprising:

a master thermal source unit having a compressor, a thermal-source-side heat exchanger connected at an end thereof to the discharge side and the inlet side of the compressor so as to be switchable between the two sides of the compressor and connected at the other end to a liquid line, and a thermal-source-side expansion mechanism which is disposed on the liquid line and capable of regulating an opening thereof, in which a gas line is connected to the discharge side and the inlet side of the compressor so as to be switchable between the two sides of the compressor;

a slave thermal source unit having a compressor, a thermal-source-side heat exchanger connected at an end thereof to the discharge side and the inlet side of the compressor so as to be switchable between the two sides of the compressor and connected at the other end to a liquid line, and a thermal-source-side expansion mechanism which is disposed on the liquid line and capable of regulating an opening thereof, in which a gas line is connected to the discharge side and the inlet side of the compressor so as to be switchable between the two sides of the compressor;

a connecting circuit part for connecting outer ends of the liquid lines and outer ends of the gas lines to a main liquid line and a main gas line respectively so that the thermal source units are arranged in parallel with each other;

a plurality of user units which each have a user-side heat exchanger and which are connected to the main liquid line and the main gas line so as to be arranged in parallel with one another;

a receiver which is disposed at a connecting part located between the liquid lines and the main liquid line and connects each of the liquid lines to the main liquid line;

a gas-line closing mechanism which is disposed on the gas line extending toward the slave thermal source unit and fully closed when the slave thermal source unit is deactivated during heating operation; and full-closure control means for controlling the thermal-source-side expansion mechanism of the slave thermal source unit in deactivation to be fully closed when the slave thermal source unit is deactivated during refrigerating operation;

wherein the connecting circuit part is formed in a single unit.

* * * * *